US012571676B2

(12) United States Patent
Saitoh et al.

(10) Patent No.: US 12,571,676 B2
(45) Date of Patent: Mar. 10, 2026

(54) SPECTROSCOPE

(71) Applicant: FUJIFILM Corporation, Tokyo (JP)

(72) Inventors: Yukito Saitoh, Minamiashigara (JP); Yujiro Yanai, Minamiashigara (JP); Hiroshi Sato, Minamiashigara (JP); Takashi Yonemoto, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 289 days.

(21) Appl. No.: 18/402,286

(22) Filed: Jan. 2, 2024

(65) Prior Publication Data

US 2024/0159589 A1 May 16, 2024

Related U.S. Application Data

(63) Continuation of application No. PCT/JP2022/025142, filed on Jun. 23, 2022.

(30) Foreign Application Priority Data

Jul. 8, 2021 (JP) ................................ 2021-113529

(51) Int. Cl.
*G01J 3/18* (2006.01)

(52) U.S. Cl.
CPC ...................................... *G01J 3/18* (2013.01)

(58) Field of Classification Search
CPC .. G01J 3/18; G01J 3/2823; G02B 5/18; G02B 5/30
See application file for complete search history.

(56) References Cited

U.S. PATENT DOCUMENTS 6,606,156 B1 8/2003 Ehbets et al.
7,232,594 B2 * 6/2007 Miroshin .......... G02F 1/133536 349/97

(Continued)

FOREIGN PATENT DOCUMENTS

CN 102246089 A * 11/2011 ....... G02F 1/133528
JP 2000-298066 A 10/2000

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2022/025142, dated Jan. 18, 2024, with an English translation.

(Continued)

*Primary Examiner* — Abdullahi Nur
(74) *Attorney, Agent, or Firm* — Birch, Stewart, Kolasch & Birch, LLP

(57) ABSTRACT

Provided is a spectroscope excellent in measurement efficiency. A spectroscope that separates incident light to be measured including a spectroscopic unit that reflects and separates incident light and a detection unit that detects light reflected from the spectroscopic unit, in which the spectroscopic unit includes a first cholesteric liquid crystal layer obtained by fixing a cholesteric liquid crystalline phase and a second cholesteric liquid crystal layer obtained by fixing a cholesteric liquid crystalline phase, the first cholesteric liquid crystal layer and the second cholesteric liquid crystal layer have a liquid crystal alignment pattern in which an orientation of an optical axis derived from a liquid crystal compound changes while continuously rotating in at least one in-plane direction, a rotation direction of the optical axis in the liquid crystal alignment pattern of the first cholesteric liquid crystal layer is opposite to a rotation direction of the (Continued)

optical axis in the liquid crystal alignment pattern of the second cholesteric liquid crystal layer, and a twisted direction of the liquid crystal compound in a thickness direction of the first cholesteric liquid crystal layer is opposite to a twisted direction of the liquid crystal compound in a thickness direction of the second cholesteric liquid crystal layer.

15 Claims, 6 Drawing Sheets

(56) References Cited

U.S. PATENT DOCUMENTS

| | | | | |
|---|---|---|---|---|
| 2014/0268138 | A1 | 9/2014 | Yokino et al. | |
| 2020/0386932 | A1 | 12/2020 | Sato et al. | |
| 2021/0011295 | A1 | 1/2021 | Sato et al. | |
| 2021/0088703 | A1 | 3/2021 | Saitoh et al. | |
| 2021/0149248 | A1 | 5/2021 | Saitoh et al. | |
| 2021/0149256 | A1 * | 5/2021 | Sato | G02B 5/18 |
| 2022/0333987 | A1 | 10/2022 | Sato et al. | |

FOREIGN PATENT DOCUMENTS

| | | | | |
|---|---|---|---|---|
| JP | 2013-29325 | A | 2/2013 | |
| WO | WO 2019/163944 | A1 | 8/2019 | |
| WO | WO 2019/189852 | A1 | 10/2019 | |
| WO | WO 2019/221294 | A1 | 11/2019 | |
| WO | WO 2020/022434 | A1 | 1/2020 | |
| WO | WO-2020022504 | A1 * | 1/2020 | G02B 5/18 |
| WO | WO-2020110806 | A1 * | 6/2020 | F21V 7/00 |
| WO | WO 2021/132630 | A1 | 7/2021 | |

OTHER PUBLICATIONS

International Search Report (Form PCT/ISA/210) for International Application No. PCT/JP2022/025142, dated Aug. 16, 2022, with an English translation.

* cited by examiner

SPECTROSCOPE

CROSS-REFERENCE TO RELATED APPLICATIONS

This application is a Continuation of PCT International Application No. PCT/JP2022/025142 filed on Jun. 23, 2022, which claims priority under 35 U.S.C. § 119(a) to Japanese Patent Application No. 2021-113529 filed on Jul. 8, 2021. The above applications are hereby expressly incorporated by reference, in their entirety, into the present application.

BACKGROUND OF THE INVENTION

1. Field of the Invention

The present invention relates to a spectroscope.

2. Description of the Related Art

A spectroscope for measuring a spectrum of light can be used for analyzing components of gas, liquid, and solid. In a spectroscope, a prism, a diffraction element, and the like are used as a member for separating light.

For example, JP2000-298066A discloses a spectrometer including a carrier, a measurement light beam input disposed in the carrier, a diffraction grating disposed in the carrier to disperse the measurement light beam received from the measurement light beam input, a photoelectron detector disposed in the carrier to receive and detect the measurement light beam dispersed by the diffraction grating, at least one optical element that forms an image of the measurement light beam on the detector through the diffraction grating, and a base plate attached to the carrier to support the photoelectron detector, in which the photoelectron detector is attached to a predetermined position on the base plate, and the base plate and the carrier include a positioning member for relatively positioning the base plate at a predetermined position of the carrier.

SUMMARY OF THE INVENTION

Since component analysis by spectroscopy can be used for various kinds of analysis, there is a demand for a reduction in the size of a spectroscope in order to use the spectroscope for various applications. In order to miniaturize a spectroscope using a diffraction element, it is necessary to increase a diffraction angle by the diffraction element in order to separate light for each wavelength in a short distance.

However, in a case where the diffraction angle of the diffraction element included in the spectroscope of the related art is increased, the diffraction efficiency is likely to decrease, and it is difficult to obtain high diffraction efficiency in a wide range corresponding to the spectral detection range, and thus the amount of separated light decreases. Therefore, in a case where the separated light is detected by the detection unit, it is necessary to extend the detection time in order to maintain the measurement accuracy of the spectrum, and the measurement efficiency is not sufficient.

In view of the above circumstances, an object of the present invention is to provide a spectroscope having excellent measurement efficiency.

The present inventors have found that the objects can be accomplished by the following configurations.

[1] A spectroscope that separates incident light to be measured, the spectroscope including a spectroscopic unit that reflects and separates incident light and a detection unit that detects the light reflected from the spectroscopic unit, in which the spectroscopic unit includes a first cholesteric liquid crystal layer obtained by fixing a cholesteric liquid crystalline phase and a second cholesteric liquid crystal layer obtained by fixing a cholesteric liquid crystalline phase, the first cholesteric liquid crystal layer and the second cholesteric liquid crystal layer have a liquid crystal alignment pattern in which an orientation of an optical axis derived from a liquid crystal compound changes while continuously rotating in at least one in-plane direction, a rotation direction of the optical axis in the liquid crystal alignment pattern of the first cholesteric liquid crystal layer is opposite to a rotation direction of the optical axis in the liquid crystal alignment pattern of the second cholesteric liquid crystal layer, and a twisted direction of the liquid crystal compound in a thickness direction of the first cholesteric liquid crystal layer is opposite to a twisted direction of the liquid crystal compound in a thickness direction of the second cholesteric liquid crystal layer.

[2] A spectroscope that separates incident light to be measured, the spectroscope including a spectroscopic unit that reflects and separates incident light and a detection unit that detects the light reflected from the spectroscopic unit, in which the spectroscopic unit includes a first cholesteric liquid crystal layer obtained by fixing a cholesteric liquid crystalline phase, a half-wavelength plate, and a second cholesteric liquid crystal layer obtained by fixing a cholesteric liquid crystalline phase in this order, the first cholesteric liquid crystal layer and the second cholesteric liquid crystal layer have a liquid crystal alignment pattern in which an orientation of an optical axis derived from a liquid crystal compound changes while continuously rotating in at least one in-plane direction, a rotation direction of the optical axis in the liquid crystal alignment pattern of the first cholesteric liquid crystal layer and a rotation direction of the optical axis in the liquid crystal alignment pattern of the second cholesteric liquid crystal layer are the same, and a twisted direction of the liquid crystal compound in a thickness direction of the first cholesteric liquid crystal layer and a twisted direction of the liquid crystal compound in a thickness direction of the second cholesteric liquid crystal layer are the same.

[3] The spectroscope according to [1] or [2], in which the spectroscopic unit further includes a C-plate.

[4] The spectroscope according to any of [1] to [3], in which one of the first cholesteric liquid crystal layer or the second cholesteric liquid crystal layer is a layer formed of a rod-like liquid crystal compound, and the other of the first cholesteric liquid crystal layer or the second cholesteric liquid crystal layer is a layer formed of a disk-like liquid crystal compound.

[5] The spectroscope according to any of [1] to [3], in which at least one of the first cholesteric liquid crystal layer or the second cholesteric liquid crystal layer includes a layer formed of a rod-like liquid crystal compound and a layer formed of a disk-like liquid crystal compound.

[6] The spectroscope according to any of [1] to [5], further including a transmission unit that is disposed on an incidence side of the spectroscopic unit and that allows the light to be measured to be incident on the spectroscopic unit.

According to the present invention, it is possible to provide a spectroscope having excellent measurement efficiency.

DESCRIPTION OF THE PREFERRED EMBODIMENTS

Figure 1:
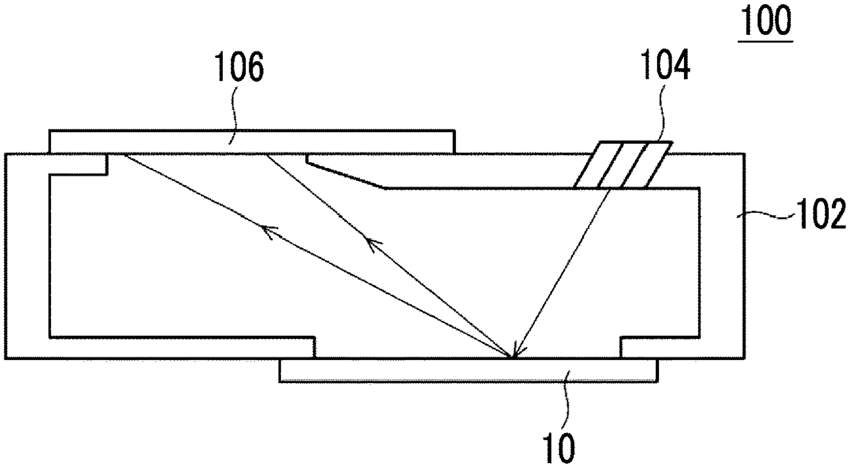
FIG. 1 is a cross-sectional view schematically showing an example of a spectroscope of the present invention.

Hereinafter, the present invention will be described in detail. The constitutional requirements described below are sometimes explained based on typical embodiments of the present invention, but the present invention is not limited to such embodiments.

In the present specification, a numerical range represented by using "to" means a range including numerical values described before and after "to" as a lower limit value and an upper limit value. In the present specification, as each component, one kind of substance corresponding to each component may be used alone, or two or more kinds thereof may be used in combination. Here, in a case where the two or more substances are used in combination for each component, the content of the component refers to the total content of the substances used in combination unless otherwise specified. In the present specification, "(meth)acrylate" is used to mean "either one or both of acrylate and methacrylate".

In the present specification, visible light is light having a wavelength that can be seen by human eyes among electromagnetic waves and indicates light in a wavelength range of 380 to 780 nm. Invisible light is light in a wavelength range of less than 380 nm and a wavelength range of more than 780 nm. Further, although not limited thereto, among visible light, light in a wavelength range of 420 to 490 nm is blue light, light in a wavelength range of 495 to 570 nm is green light, and light in a wavelength range of 620 to 750 nm is red light.

In the present specification, the birefringence of the cholesteric liquid crystal layer, each region, and the like represents birefringence at a wavelength of 550 nm. In the present specification, the reflection wavelength range means a range of a wavelength of circularly polarized light derived from the cholesteric liquid crystal layer and selectively reflected.

Spectroscope of First Embodiment

A spectroscope according to the first embodiment of the present invention is a spectroscope that separates incident light to be measured including a spectroscopic unit that reflects and separates incident light and a detection unit that detects the light reflected from the spectroscopic unit, in which the spectroscopic unit includes a first cholesteric liquid crystal layer obtained by fixing a cholesteric liquid crystalline phase and a second cholesteric liquid crystal layer obtained by fixing a cholesteric liquid crystalline phase, the first cholesteric liquid crystal layer and the second cholesteric liquid crystal layer have a liquid crystal alignment pattern in which an orientation of an optical axis derived from a liquid crystal compound changes while continuously rotating in at least one in-plane direction, a rotation direction of the optical axis in the liquid crystal alignment pattern of the first cholesteric liquid crystal layer is opposite to a rotation direction of the optical axis in the liquid crystal alignment pattern of the second cholesteric liquid crystal layer, and a twisted direction of the liquid crystal compound in a thickness direction of the first cholesteric liquid crystal layer is opposite to a twisted direction of the liquid crystal compound in a thickness direction of the second cholesteric liquid crystal layer.

FIG. 1 shows a schematic cross-sectional view showing an example of the spectroscope according to the embodiment of the present invention. A spectroscope 100 illustrated in FIG. 1 includes a housing 102, a transmission unit 104, a spectroscopic unit 10, and a detection unit 106.

The housing 102 is a member that supports the transmission unit 104, the spectroscopic unit 10, and the detection unit 106 in a predetermined arrangement. Specifically, the housing 102 supports each member at a predetermined position such that light passing through the transmission unit 104 is incident on the spectroscopic unit 10 and light reflected and diffracted by the spectroscopic unit 10 is incident on the detection part 106.

In the illustrated example, the housing 102 has a substantially rectangular parallelepiped box shape having a space therein, has an opening portion 102*b* where the transmission unit 104 is disposed on one surface 102*a* thereof, has an opening portion 102*d* where the spectroscopic unit 10 is disposed on a surface 102*c* facing the surface 102*a* where the transmission unit 104 is disposed, and has an opening portion 102*e* where the detection unit 106 is disposed on a surface facing the surface 102*c* where the spectroscopic unit 10 is disposed, that is, at a position different from the opening portion 102*b* of the surface 102*a* where the transmission unit 104 is disposed.

The housing 102 is not limited to the above-described configuration as long as the housing 102 can support the transmission unit 104, the spectroscopic unit 10, and the detection unit 106 at predetermined positions such that the light transmitted through the transmission unit 104 is incident on the spectroscopic unit 10 and the light reflected and separated by the spectroscopic unit 10 is incident on the detection unit 106. For example, although the transmission unit 104 and the detection unit 106 are disposed on the same surface 102*a* in the above example, the transmission unit 104 and the detection unit 106 may be disposed on different surfaces. In addition, the housing 102 has a substantially rectangular parallelepiped box shape, but is not limited thereto, and may have various shapes as long as the transmission unit 104, the spectroscopic unit 10*a*, and the detection unit 106 can be supported at predetermined positions.

The transmission unit 104 allows the light to be measured to be incident on the inside of the housing 102 and to travel toward the spectroscopic unit 10 disposed on the surface 102*c* of the housing 102.

The transmission unit 104 may be a slit, a pinhole, or the like that transmits light as a spot beam. The transmission unit 104 may have a filter function of transmitting only light having a predetermined wavelength. In addition, for example, in a case where the transmission unit 104 is a slit, it is preferable that the slit longitudinal direction is a direction orthogonal to a diffraction direction by the spectroscopic unit 10 described later.

The planar shape of the transmission unit 104 (the opening portion 102*b*) can be various shapes such as a circular shape, a square shape, and a rectangular shape as long as light can be transmitted. Further, the area of the transmission unit 104 (the opening portion 102*b*) in a plan view may be appropriately set according to the use of the spectroscope 100, the size of the spectroscopic unit 10, and the like.

The spectroscopic unit 10 separates light by reflecting (diffracting) incident light passing through the transmission unit 104 at different angles according to the wavelength. The light separated by the spectroscopic unit 10 is incident on the detection unit 106.

The planar shape of the spectroscopic unit 10 (the opening portion 102*d*) can be various shapes such as a circular shape, a square shape, and a rectangular shape as long as the spot light transmitted through the transmission unit 104 can be reflected. The area of the spectroscopic unit 10 (the opening portion 102*d*) in a plan view may be appropriately set according to the use of the spectroscope 100, the size of the spot light transmitted through the transmission unit 104, the performance of the spectroscopic unit 10, and the like.

The configuration of the spectroscopic unit 10 will be described in detail later.

The detection unit 106 measures the amount of light separated by the spectroscopic unit 10 for each wavelength range. The spectrum of the light to be measured can be obtained from the measurement result of the detection unit 106.

As the detection unit 106, it is possible to appropriately use a detection unit used in a spectroscope in the related art which can measure the amount of light for each wavelength range of the separated light. For example, as the detection unit 106, a two dimensional or three dimensional photoelectric conversion element such as a charge coupled device (CCD) sensor or a CMOS sensor can be used.

The planar shape of the detection unit 106 (the opening portion 102*e*) may be various shapes such as a circular shape, a square shape, and a rectangular shape as long as the light separated by the spectroscopic unit 10 can be detected. In addition, the area of the detection unit 106 (the opening portion 102*e*) in a plan view may be appropriately set according to the use of the spectroscope 100, the spectroscopic performance of the spectroscopic unit 10, and the like.

In such a spectroscope 100, when the light to be measured is incident on the transmission unit 104, as indicated by an arrow in FIG. 1, the light (light to be measured) incident on the internal space of the housing 102 from the transmission unit 104 travels toward the spectroscopic unit 10 and is reflected by the spectroscopic unit 10. At the time of reflection, the spectroscopic unit 10 separates the light, and thus the separated light travels in different directions according to the wavelength and is incident on the detection unit 106. The detection unit 106 measures the amount of light for each wavelength by detecting the amount of light for each incident position. Accordingly, the spectroscope 100 can obtain the spectrum of the light to be measured.

Here, in the present invention, the spectroscopic unit 10 includes a first cholesteric liquid crystal layer formed by fixing a cholesteric liquid crystalline phase and a second cholesteric liquid crystal layer formed by fixing a cholesteric liquid crystalline phase, and has the configuration in which the first cholesteric liquid crystal layer and the second cholesteric liquid crystal layer have a liquid crystal alignment pattern in which an orientation of an optical axis derived from a liquid crystal compound changes while continuously rotating in at least one in-plane direction, the rotation direction of the optical axis in the liquid crystal alignment pattern of the first cholesteric liquid crystal layer is opposite to the rotation direction of the optical axis in the liquid crystal alignment pattern of the second cholesteric liquid crystal layer, and the twisted direction of the liquid crystal compound in the thickness direction of the first cholesteric liquid crystal layer is opposite to the twisted direction of the liquid crystal compound in the thickness direction of the second cholesteric liquid crystal layer. This point is described below with reference to FIG. 2.

Figure 2:
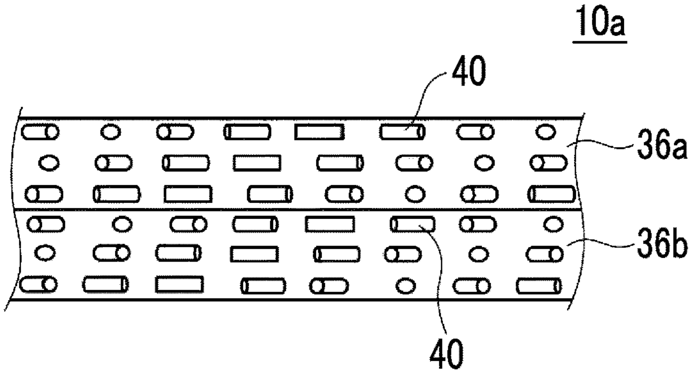
FIG. 2 is a side view conceptually showing an example of the spectroscopic unit included in the spectroscope.

FIG. 2 is a side view conceptually showing an example of the spectroscopic unit. The spectroscopic unit 10*a* shown in FIG. 2 includes a first cholesteric liquid crystal layer 36*a* and a second cholesteric liquid crystal layer 36*b*. The first cholesteric liquid crystal layer 36*a* and the second cholesteric liquid crystal layer 36*b* are layers formed by aligning and fixing a liquid crystal compound to a cholesteric liquid crystalline phase.

The first cholesteric liquid crystal layer 36*a* has the liquid crystal alignment pattern in which the orientation of the optical axis derived from the liquid crystal compound 40 changes while rotating to the right (clockwise) from the left to the right when observed from above in FIG. 2. In addition, in the first cholesteric liquid crystal layer 36*a*, the twisted structure of the cholesteric liquid crystalline phase is twisted rightward (clockwise) from top to bottom in FIG. 2.

On the other hand, the second cholesteric liquid crystal layer 36*b* has a liquid crystal alignment pattern in which the orientation of the optical axis derived from the liquid crystal compound 40 changes while rotating to the left (counterclockwise) from the left to the right in a case of being observed from the top in FIG. 2. In addition, in the second cholesteric liquid crystal layer 36*b*, the twisted structure in the thickness direction of the cholesteric liquid crystalline phase is twisted leftward (counterclockwise) from the top to the bottom in FIG. 2.

That is, between the first cholesteric liquid crystal layer 36*a* and the second cholesteric liquid crystal layer 36*b*, the rotation directions of the optical axes derived from the liquid crystal compound 40 in the liquid crystal alignment pattern are opposite to each other, and the twisted directions of the liquid crystal compound in the thickness direction are opposite to each other.

The rotation direction of the optical axis derived from the liquid crystal compound 40 in the liquid crystal alignment pattern of the first cholesteric liquid crystal layer 36*a* and the second cholesteric liquid crystal layer 36*b*, and the twisted direction of the liquid crystal compound in the thickness direction are not limited to the above examples, and it is sufficient that the rotation directions of the optical axes derived from the liquid crystal compounds 40 in the liquid crystal alignment patterns between the first cholesteric liquid crystal layer 36*a* and the second cholesteric liquid crystal layer 36*b* are opposite to each other and the twisted directions of the liquid crystal compounds in the thickness direction are opposite to each other.

The action of the spectroscopic unit 10*a* having such a configuration will be described. As is well known, the cholesteric liquid crystal layer selectively reflects dextrorotatory circularly polarized light or levorotatory circularly polarized light having a selective reflection wavelength according to the twisted direction in the thickness direction of the cholesteric liquid crystalline phase. In addition, in a case where the cholesteric liquid crystal layer has the liquid crystal alignment pattern in which the orientation of the optical axis derived from the liquid crystal compound changes while continuously rotating in at least one in-plane direction, the cholesteric liquid crystal layer has a property of reflecting (diffracting) light to be reflected in a direction different from specular reflection. In addition, the orientation of light diffraction in the cholesteric liquid crystal layer having the liquid crystal alignment pattern depends on the turning direction of light to be reflected and the rotation direction of the optical axis in the liquid crystal alignment pattern. For example, in the first cholesteric liquid crystal layer 36*a* of the example shown in FIG. 2, the twisted direction in the thickness direction is right twisted, and the rotation direction of the liquid crystal alignment pattern is a right direction, and therefore, dextrorotatory circularly polarized light incident from above in the drawing is reflected in the upper left direction. On the other hand, since the twisted direction in the thickness direction of the second cholesteric liquid crystal layer 36*b* is left twisted and the rotation direction of the liquid crystal alignment pattern is left direction, levorotatory circularly polarized light incident from above in the drawing is reflected in the upper left direction. That is, the first cholesteric liquid crystal layer 36*a* and the second cholesteric liquid crystal layer 36*b* diffract circularly polarized light in opposite turning directions in the same orientation. Therefore, since the spectroscopic unit 10*a* can reflect the light in the same direction regardless of the polarization state of the incident light, it is possible to increase the amount of light in each of the separated wavelength ranges.

Figure 3:
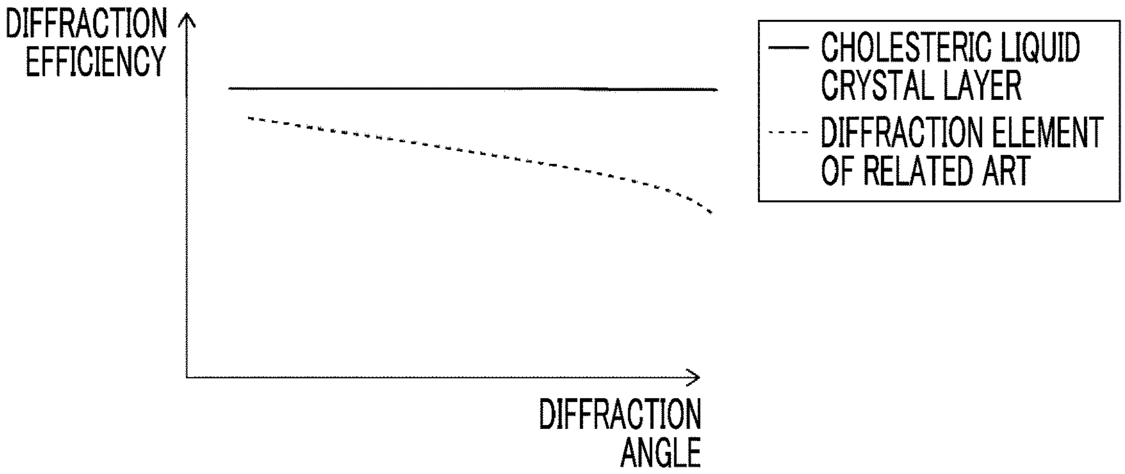
FIG. 3 is a graph conceptually showing a relationship between a diffraction angle and diffraction efficiency in the diffraction element.

Further, as shown by a broken line in the schematic graph of FIG. 3, the diffraction efficiency of the diffraction element used in the conventional spectroscope decreases as the diffraction angle increases, whereas as shown by a solid line in the graph of FIG. 3, the diffraction efficiency of the diffraction by the cholesteric liquid crystal layer is less likely to decrease even when the diffraction angle increases. As an example, the cholesteric liquid crystal layer used in the present invention can have a diffraction efficiency of 90% or more in a wavelength range of 380 to 780 nm.

Figure 4:
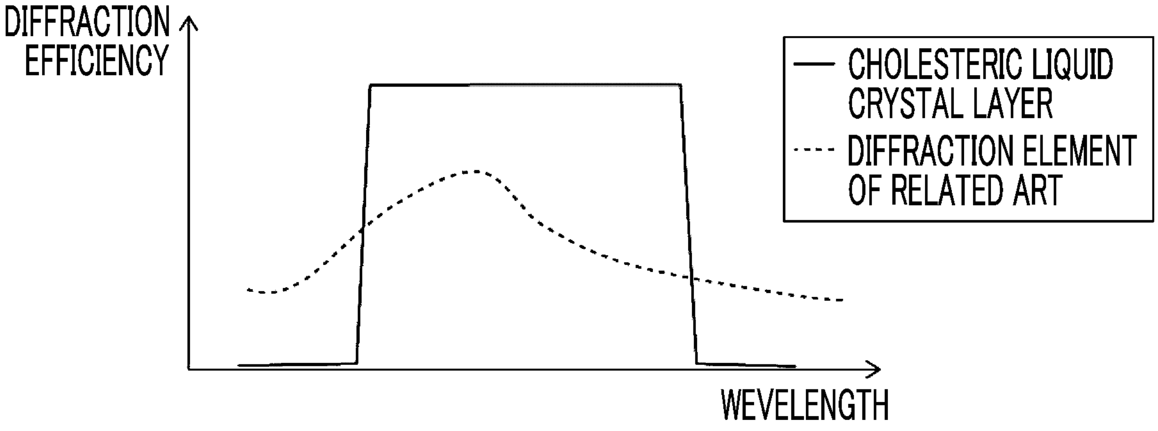
FIG. 4 is a graph conceptually showing a relationship between a wavelength and a diffraction efficiency in the diffraction element.

As indicated by a broken line in the schematic graph of FIG. 4, in the diffraction element used in the spectroscope of the related art, the relationship between the wavelength and the diffraction efficiency is continuous. Therefore, light outside the measurement range may also be diffracted, and may be detected as noise in the detection unit 106. On the other hand, as shown by the solid line in the graph of FIG. 4, the diffraction by the cholesteric liquid crystal layer diffracts light in a specific wavelength range with high diffraction efficiency, and hardly diffracts light in other wavelength regions. Therefore, it is possible to suppress light outside the measurement range from being detected in the detection unit 106, and to suppress noise.

As described above, since the spectroscopic unit 10*a* can bend the angle of light at a large diffraction angle, different diffraction angles of light depending on wavelengths can be obtained at a high resolution angle, and light can be diffracted with high diffraction efficiency. Therefore, the amount of separated light incident on the detection unit 106 is increased, and the detection accuracy is also increased, so that the spectroscope according to the embodiment of the present invention can measure a spectrum with high accuracy even in a short detection time, and can increase the measurement efficiency.

Another Example of Spectroscopic Unit

In the example shown in FIG. 2, the spectroscopic unit 10*a* is configured to consist of two cholesteric liquid crystal layers, but the present invention is not limited thereto, and may have another layer. As an example, the spectroscopic unit 10*a* may have a C-plate.

Figure 5:
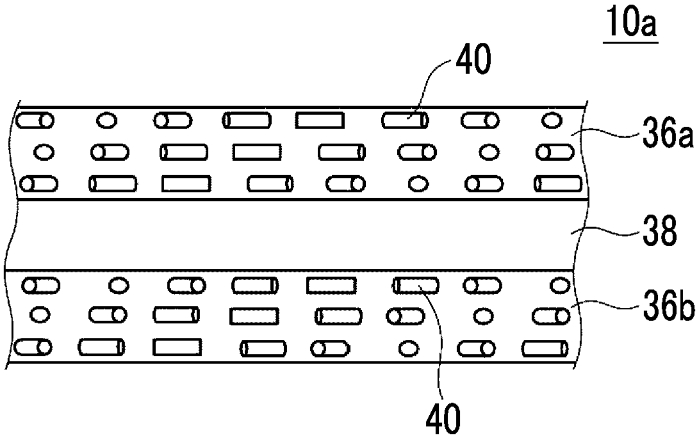
FIG. 5 is a side view conceptually showing another example of the spectroscopic unit included in the spectroscope.

FIG. 5 conceptually shows another example of the spectroscopic unit included in the spectroscope of the embodiment of the present invention. The spectroscopic unit 10*a* shown in FIG. 5 has the first cholesteric liquid crystal layer 36*a*, the C-plate 38, and the second cholesteric liquid crystal layer 36*b* in this order. Since the configurations of the first cholesteric liquid crystal layer 36*a* and the second cholesteric liquid crystal layer 36*b* in the spectroscopic unit 10*a* shown in FIG. 5 are the same as the configurations of the first cholesteric liquid crystal layer 36*a* and the second cholesteric liquid crystal layer 36*b* of the spectroscopic unit 10 shown in FIG. 2, the description thereof is omitted.

The C-plate may be any of a positive C-plate or a negative C-plate. In a case where the first cholesteric liquid crystal layer 36*a* and the second cholesteric liquid crystal layer 36*b* are formed of a rod-like liquid crystal compound, since the spectroscopic unit 10*a* has the C-plate, the thickness-direction retardation Rth in the entire spectroscopic unit 10*a* can be reduced, and thus, since the twisted direction of the circularly polarized light is different from the twisted direction of the cholesteric liquid crystal layer, in a case where the circularly polarized light is transmitted as it is, the transmitted light elliptically polarized at Rth of the cholesteric liquid crystal layer is optically compensated by the C-plate having Rth having an opposite sign to return to the circularly polarized light, and thus, selective reflection can be performed with high efficiency. In a case where the cholesteric liquid crystal layer is a rod-like liquid crystal compound, a C-plate having negative Rth is preferably used, and in a case where the cholesteric liquid crystal layer is a disk-like liquid crystal compound, a C-plate having positive Rth is preferably used.

In the example shown in FIG. 5, the C-plate 38 is disposed between the first cholesteric liquid crystal layer 36*a* and the second cholesteric liquid crystal layer 36*b*, but is not limited thereto, and may be disposed on the surface of the first cholesteric liquid crystal layer 36*a* opposite to the second cholesteric liquid crystal layer 36*b*, or may be disposed on the surface of the second cholesteric liquid crystal layer 36*b* opposite to the first cholesteric liquid crystal layer 36*a*.

In addition, in the example shown in FIG. 2, both of the two cholesteric liquid crystal layers in the spectroscopic unit 10*a* are layers formed using a rod-like liquid crystal compound, but the present invention is not limited thereto, and both of the first cholesteric liquid crystal layer and the second cholesteric liquid crystal layer may be layers formed using a disk-like liquid crystal compound. Alternatively, one of the first cholesteric liquid crystal layer or the second cholesteric liquid crystal layer may be a layer formed of a rod-like liquid crystal compound, and the other may be a layer formed of a disk-like liquid crystal compound. The cholesteric liquid crystal layer formed of the disk-like liquid crystal compound will be described in detail later.

In a case where one of the first cholesteric liquid crystal layer and the second cholesteric liquid crystal layer is a layer formed of a rod-like liquid crystal compound and the other is a layer formed of a disk-like liquid crystal compound, the thickness-direction retardation Rth in the entire spectroscopic unit 10*a* can be reduced, and thus the light elliptically polarized by optical compensation can be returned to circularly polarized light to be selectively reflected with high efficiency.

<Cholesteric Liquid Crystal Layer>

The first cholesteric liquid crystal layer 36*a* and the second cholesteric liquid crystal layer 36*b* will be described with reference to FIG. 6 and FIG. 7. Since the first cholesteric liquid crystal layer 36*a* and the second cholesteric liquid crystal layer 36*b* have the same configuration except that the rotation direction of the optical axis in the liquid crystal alignment pattern and the twisted direction of the optical axis in the thickness direction are different, in a case where it is not necessary to distinguish the first cholesteric liquid crystal layer 36*a* and the second cholesteric liquid crystal layer 36*b*, the first cholesteric liquid crystal layer and the second cholesteric liquid crystal layer will be collectively described as the cholesteric liquid crystal layer 36.

Figure 6:
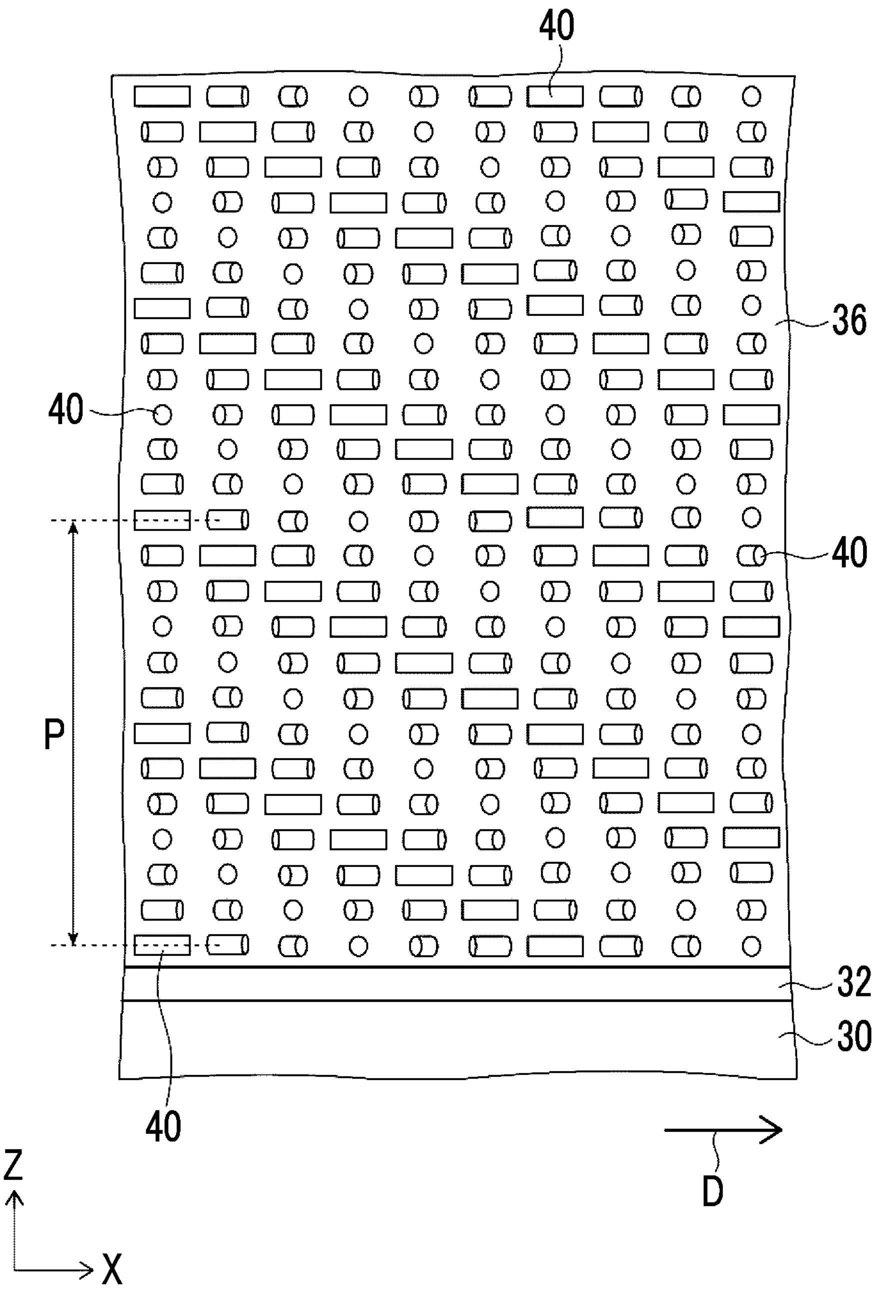
FIG. 6 is a cross-sectional view conceptually showing an example of the cholesteric liquid crystal layer.

In order to explain the cholesteric liquid crystal layer, FIG. 6 shows a cross-sectional view of the cholesteric liquid crystal layer 36. FIG. 7 is a plan view of the cholesteric liquid crystal layer 36 shown in FIG. 6. The plan view is a view in a case where the cholesteric liquid crystal layer 36 is viewed from above. In FIG. 6, the cholesteric liquid crystal layer 36 is illustrated as being formed on the alignment film 32 on the support 30. In FIG. 6, an X direction and a Z direction indicate orientations of two coordinate axes orthogonal to each other on an observation surface. The Z direction is parallel to the thickness direction of the cholesteric liquid crystal layer 36. In FIG. 7, an X direction and a Y direction indicate orientations of two coordinate axes orthogonal to each other on an observation surface.

The cholesteric liquid crystal layer 36 has a helical structure in which the liquid crystal compounds 40 turn along the helical axis along the thickness direction and are laminated on each other, and has a structure in which the liquid crystal compounds 40 turning spirally are laminated in a plurality of pitches in a case where a configuration in which the liquid crystal compounds 40 spirally rotate once (rotate 360°) and are laminated on each other is set as one helical pitch, as conceptually shown in FIG. 6, in the same manner as a cholesteric liquid crystal layer obtained by fixing a normal cholesteric liquid crystalline phase.

The cholesteric liquid crystal layer 36 has wavelength selective reflectivity. It is known that a cholesteric liquid crystalline phase exhibits selective reflectivity at a specific wavelength. The center wavelength λ of selective reflection (selective reflection center wavelength λ) depends on the pitch P (helical pitch) of the helical structure in the cholesteric liquid crystalline phase, and follows the relationship $\lambda = n \times P$ with the average refraction index n of the cholesteric liquid crystalline phase. Therefore, the selective reflection center wavelength can be adjusted by adjusting the pitch of the helical structure. The helical pitch of the cholesteric liquid crystalline phase depends on the kind of the chiral agent used together with the liquid crystal compound or the addition concentration thereof in a case of forming the cholesteric liquid crystal layer, and thus a desired pitch can be obtained by adjusting these. That is, the pitch P (helical pitch) of the helical structure in the cholesteric liquid crystalline phase refers to a helical period in the helical structure of the cholesteric liquid crystalline phase.

Further, the adjustment of the pitch is described in detail in Fujifilm Research Report No. 50 (2005), pp. 60-63. As a method of measuring the sense and the pitch of the helix, methods described in "Introduction to Experimental Liquid Crystal Chemistry", edited by The Japanese Liquid Crystal Society, Sigma Publishing, published in 2007, p. 46, and "Liquid Crystal Handbook", Editing Committee of Liquid Crystal Handbook, Maruzen, p. 196 can be used. In the present specification, a selective reflection center wavelength (for example, a selective reflection center wavelength of a reflective layer or a selective reflection center wavelength of a cholesteric liquid crystal layer) refers to an average value of two wavelengths showing T½ (%) represented by the following Expression, where Tmin (%) is a minimum value of a transmittance of a target object (member).

Expression for obtaining half-value transmittance:

$$T_{1/2} = 100 - (100 - T_{min}) \div 2$$

The cholesteric liquid crystalline phase exhibits selective reflectivity with respect to either left or right circularly polarized light at a specific wavelength. Whether the reflected light is dextrorotatory circularly polarized light or levorotatory circularly polarized light depends on the twisted direction (sense) of the helix of the cholesteric liquid crystalline phase. Regarding the selective reflection of circularly polarized light by the cholesteric liquid crystalline phase, dextrorotatory circularly polarized light is reflected in a case where the helical twisted direction of the cholesteric liquid crystalline phase is right, and levorotatory circularly polarized light is reflected in a case where the helical twisted direction is left. Therefore, the cholesteric liquid crystal layer 36 shown in FIG. 6 is a layer obtained by fixing a right-twisted cholesteric liquid crystalline phase. The turning direction of the cholesteric liquid crystalline phase can be adjusted by the kind of the liquid crystal compound forming the cholesteric liquid crystal layer and/or the kind of the chiral agent to be added.

A half-width Δλ (nm) of a reflection wavelength range (circularly polarized light reflection range) in which selective reflection occurs depends on the birefringence Δn of the cholesteric liquid crystal layer and the pitch P of the helix, and satisfies a relationship of $\Delta\lambda = \Delta n \times P$. Therefore, by adjusting $\Delta n$, the width of the reflection wavelength range can be controlled. $\Delta n$ can be adjusted by the kind of the liquid crystal compound forming the cholesteric liquid crystal layer, the mixing ratio thereof, and the temperature at the time of fixing the alignment. The half-width of the reflection wavelength range is adjusted according to the use of the spectroscope 100 and is preferably 10 to 600 nm, more preferably 20 to 300 nm, and still more preferably 30 to 150 nm.

As described above, the turning direction of the circularly polarized light reflected by the first cholesteric liquid crystal layer 36*a* is opposite to the turning direction of the circularly polarized light reflected by the second cholesteric liquid crystal layer 36*b*.

In addition, it is preferable that the reflection wavelength range of the first cholesteric liquid crystal layer 36*a* and the reflection wavelength range of the second cholesteric liquid crystal layer 36*b* overlap each other.

The reflection wavelength range of the first cholesteric liquid crystal layer 36*a* and the reflection wavelength range of the second cholesteric liquid crystal layer 36*b* are not limited to an aspect in which they completely overlap each other, and the reflection wavelength ranges may at least partially overlap each other. From the viewpoint of the light reflection amount of the spectroscopic unit, it is preferable that the overlapping region of the reflection wavelength ranges of the two cholesteric liquid crystal layers is wide. To be specific, the difference between the selective reflection center wavelengths of the two cholesteric liquid crystal layers constituting the spectroscopic unit is preferably 50 nm or less, and more preferably 25 nm or less. Among these, it is more preferable that the selective reflection center wavelengths of the two cholesteric liquid crystal layers constituting the spectroscopic unit match each other.

Figure 7:
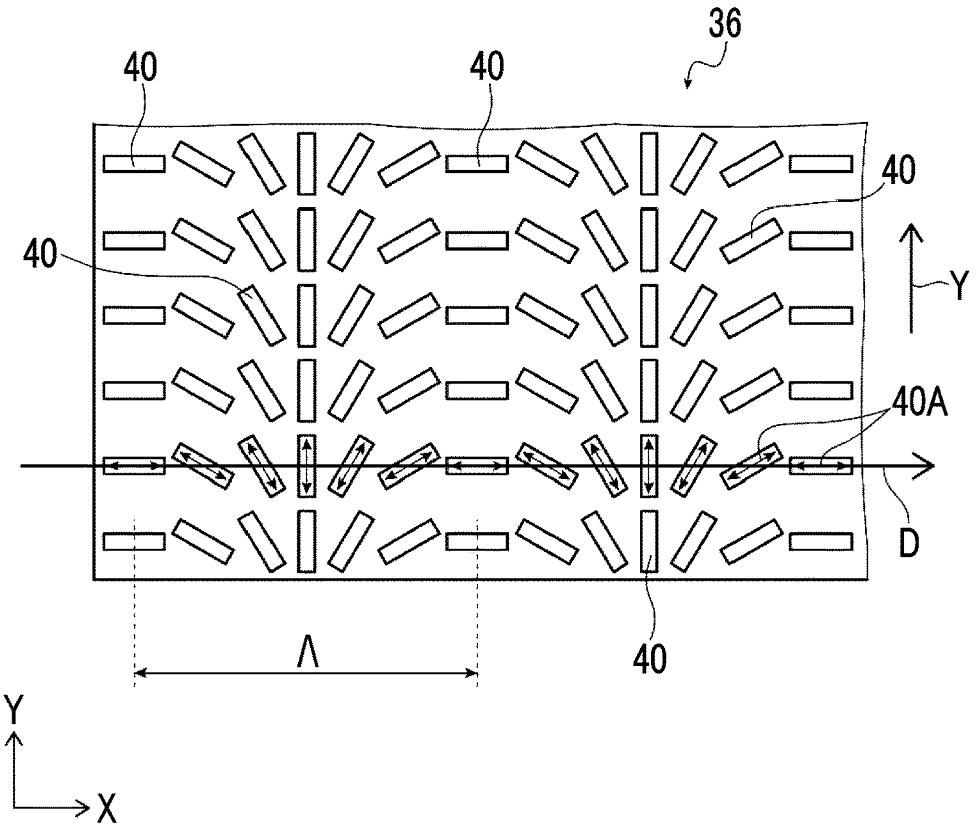
FIG. 7 is a plan view of the cholesteric liquid crystal layer shown in FIG. 6.

As shown in FIG. 6 and FIG. 7, the cholesteric liquid crystal layer 36 has a liquid crystal alignment pattern in which the orientation of the optical axes 40A derived from the liquid crystal compound 40 forming the cholesteric liquid crystalline phase changes while continuously rotating in one direction in the plane of the cholesteric liquid crystal layer. The optical axis 40A derived from the liquid crystal compound 40 is an axis having the highest refractive index in the liquid crystal compound 40. For example, in a case where the liquid crystal compound 40 is a rod-like liquid crystal compound, the optical axis 40A is along a rod-like major axis direction. In addition, in a case where the liquid crystal compound is a disk-like liquid crystal compound, the optical axis 40A is along a direction perpendicular to a disk plane. In the following description, the optical axis 40A derived from the liquid crystal compound 40 will also be referred to as "optical axis 40A of liquid crystal compound 40" or "optical axis 40A".

As shown in FIG. 7, the liquid crystal compound 40 constituting the cholesteric liquid crystal layer 36 is two dimensionally arranged in the X direction and the direction orthogonal to the X direction (Y direction). The liquid crystal compound 40 forming the cholesteric liquid crystal layer 36 has the liquid crystal alignment pattern in which the orientation of the optical axes 40A changes while continuously rotating along the arrangement axis D parallel to the X direction in the in-plane direction. In the illustrated example, the liquid crystal compound has a liquid crystal alignment pattern in which the optical axis 40A of the liquid crystal compound 40 changes while continuously rotating clockwise along the arrow direction of the arrangement axis D.

"The orientation of the optical axis 40A of the liquid crystal compounds 40 changes while continuously rotating in the direction of the arrow of the arrangement axis D (one predetermined direction)" means specifically that an angle formed between the optical axes 40A of the liquid crystal compounds 40 arranged along the direction of the arrow of the arrangement axis D and the arrangement axis D varies depending on a position on the arrangement axis D, and the angle formed between the optical axis 40A and the direction of the arrow of the arrangement axis D sequentially changes from $\theta$ to $\theta+180°$ or $\theta-180°$ along the direction of the arrow of the arrangement axis D. A difference between the angles of the optical axes 40A of the liquid crystal compounds 40 adjacent to each other in the direction of the arrangement axis D is preferably 45° or less, more preferably 15° or less, and still more preferably a smaller angle.

On the other hand, in the liquid crystal compound 40 forming the cholesteric liquid crystal layer 36, the orientations of the optical axes 40A are the same in the Y direction orthogonal to the X direction, that is, the Y direction orthogonal to the one direction (the direction of the arrangement axis D) in which the optical axis 40A continuously rotates. In other words, in the liquid crystal compound 40 forming the cholesteric liquid crystal layer 36, angles between the optical axes 40A of the liquid crystal compounds 40 and the arrangement axis D are the same in the Y direction.

In the present invention, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length $\Lambda$ of one period in the liquid crystal alignment pattern. That is, a distance between the centers of two liquid crystal compounds 40 in the arrangement axis D direction that form the same angle with the arrangement axis D direction is regarded as the length $\Lambda$ of one period. Specifically, as shown in FIG. 7, the distance between the centers of two liquid crystal compounds 40 in which the arrangement axis D direction and the direction of the optical axes 40A match each other in the arrangement axis D direction is the length $\Lambda$ of one period. In the following description, the length $\Lambda$ of one period is also referred to as "one period $\Lambda$". In the liquid crystal alignment pattern of the cholesteric liquid crystal layer, the one period $\Lambda$ is repeated in the X direction, that is, in one direction (arrangement axis D direction) in which the orientation of the optical axis 40A changes while continuously rotating.

Figure 8:
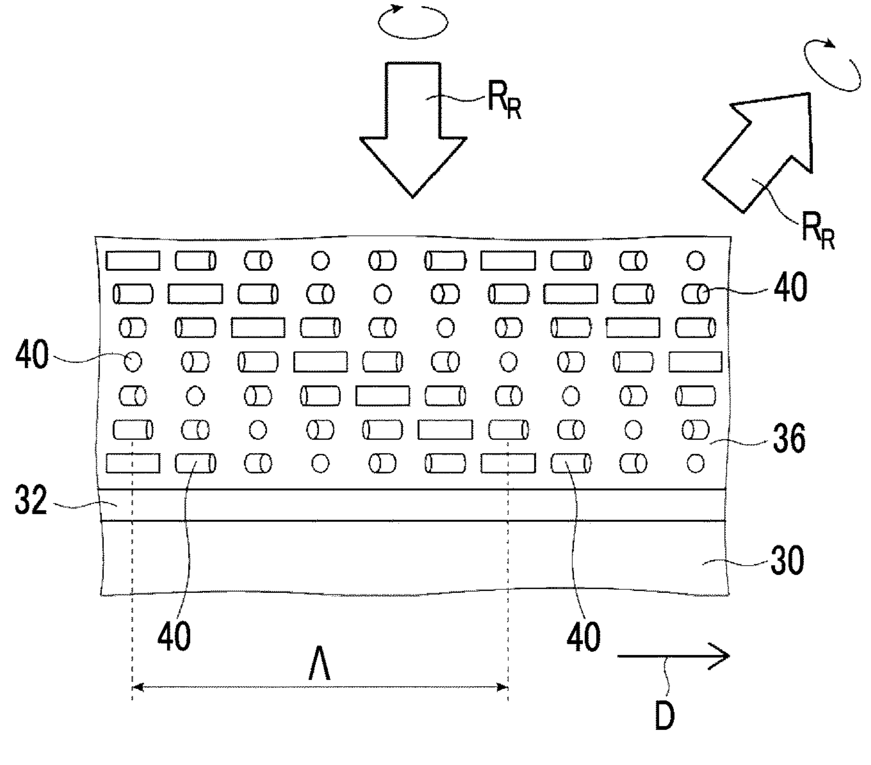
FIG. 8 is a diagram for explaining the action of the cholesteric liquid crystal layer.

The cholesteric liquid crystal layer 36 has a liquid crystal alignment pattern in which the optical axis 40A changes while continuously rotating in the arrangement axis D direction (one predetermined direction) in a plane. The cholesteric liquid crystal layer obtained by fixing a cholesteric liquid crystalline phase generally specularly reflects incident light (circularly polarized light). On the other hand, the cholesteric liquid crystal layer 36 having the above-described liquid crystal alignment pattern reflects incident light in a direction having an angle in the arrangement axis D direction with respect to specular reflection. Specifically, as shown in FIG. 8, the cholesteric liquid crystal layer 36 does not reflect the light incident from the normal direction in the normal direction, but reflects the light inclined with respect to the normal direction. The light incident from the normal direction refers to light incident from the front side, that is, light incident to be perpendicular to a main plane. The main plane refers to the maximum surface of a sheet-shaped material.

The reflection angle of light from the cholesteric liquid crystal layer in which the optical axis 40A of the liquid crystal compound 40 continuously rotates in one direction (arrangement axis D direction) varies depending on the wavelength of light to be reflected. Specifically, as the wavelength of light increases, the angle of reflected light with respect to incident light increases. In addition, a reflection angle of light from the cholesteric liquid crystal layer in which the optical axis 40A of the liquid crystal compound 40 continuously rotates in one direction (arrangement axis D direction) varies depending on the length Λ of the one period of the liquid crystal alignment pattern over which the optical axis 40A rotates by 180° in the arrangement axis D direction, that is, depending on the one period Λ. Specifically, as the length of the one period Λ decreases, the angle of reflected light with respect to incident light increases. The one period Λ is not particularly limited and may be appropriately set according to the use or the like of the spectroscope 100, and is, for example, preferably 50 μm or less and more preferably 10 μm or less. In consideration of the accuracy or the like of the liquid crystal alignment pattern, the thickness is preferably 0.1 μm or more.

As described above, the cholesteric liquid crystal layers (the first cholesteric liquid crystal layer 36*a* to the second cholesteric liquid crystal layer 36*b*) included in the spectroscope 100 have the liquid crystal alignment pattern described above. In addition, the rotation directions of the optical axes derived from the liquid crystal compound in the liquid crystal alignment patterns of the first cholesteric liquid crystal layer 36*a* and the second cholesteric liquid crystal layer 36*b* are opposite to each other.

In addition, it is preferable that the length of the one period Λ in the liquid crystal alignment pattern of the first cholesteric liquid crystal layer 36*a* is the same as the length of the one period Λ in the liquid crystal alignment pattern of the second cholesteric liquid crystal layer 36*b*.

In the present invention, the length of the one period Λ in the liquid crystal alignment pattern being the same represents that the difference between the lengths of the one periods Λ is 30% or lower. As a method of calculating the difference, when the two one periods Λ to be compared are one period Λx and one period Λy, respectively, in a case where the one period Λx is larger, the difference is calculated by the formula: {(one period Λx−one period Λy)/(one period Λx)}×100. In addition, in a case where the one period Λx and the one period Λy have the same value, the difference is 0%.

As described above, it is preferable that the difference between the lengths of the one periods Λ in the liquid crystal alignment patterns of the cholesteric liquid crystal layers included in the spectroscopic unit 10*a* is small. As described above, as the length of one period Λ decreases, the reflection angle with respect to the incident light increases. Therefore, as the difference between the lengths of the one periods Λ is smaller, the reflection direction of the light reflected by the first cholesteric liquid crystal layer 36*a* and the reflection direction of the light reflected by the second cholesteric liquid crystal layer 36*b* can be closer to each other.

The directions in which the optical axes of the liquid crystal compounds in the liquid crystal alignment patterns in the first cholesteric liquid crystal layer 36*a* and the second cholesteric liquid crystal layer 36*b* continuously change are the same. In the case of such an aspect, it is possible to match the reflection directions of light by the cholesteric liquid crystal layers included in the spectroscopic unit 10*a*. In the present invention, in a case where the directions in which the optical axes of the liquid crystal compounds in the liquid crystal alignment patterns in the two cholesteric liquid crystal layers continuously change are the same, an angle formed between the directions (arrangement axis D directions) in which the optical axes of the liquid crystal compounds in the liquid crystal alignment patterns in the two cholesteric liquid crystal layers continuously change is preferably 10° or less, more preferably 1° or less, and still more preferably 0.5° or less. The present invention is not limited to the above-described aspect, and the directions in which the optical axes of the liquid crystal compounds in the liquid crystal alignment patterns of the first cholesteric liquid crystal layer 36*a* and the second cholesteric liquid crystal layer 36*b* continuously change may be different from each other.

(Alignment Example of Liquid Crystal Compound 40)

In the example shown in FIG. 6, the liquid crystal compound 40 is aligned such that the optical axis thereof is parallel to the main plane (X-Y plane) on the X-Z plane of the cholesteric liquid crystal layer 36, but the present invention is not limited to this aspect. For example, in the X-Z plane of the cholesteric liquid crystal layer 36, the optical axis of the liquid crystal compound 40 may be aligned to be tilted with respect to the main plane (X-Y plane). In addition, in the X-Z plane of the cholesteric liquid crystal layer 36, the inclined angle (tilt angle) with respect to the main plane (X-Y plane) of the liquid crystal compound 40 was uniform in the thickness direction (Z direction), but the present invention is not limited to this aspect. The cholesteric liquid crystal layer may have a region in which the tilt angle of the liquid crystal compound 40 varies in the thickness direction. For example, the optical axis of the liquid crystal compound 40 may be parallel to the main plane on one surface of the cholesteric liquid crystal layer (a pre-tilt angle is 0°), the tilt angle of the liquid crystal compound 40 may increase as the distance from the one surface increases in the thickness direction, and then the liquid crystal compound may be aligned at a constant tilt angle to the other surface side. As described above, the cholesteric liquid crystal layer may have a configuration in which the optical axis of the liquid crystal compound 40 has a pre-tilt angle at one of the upper and lower interfaces, or may have a configuration in which the optical axis of the liquid crystal compound 40 has a pre-tilt angle at both interfaces. In addition, the pre-tilt angle may be different between both interfaces.

In a case where the X-Z surface of the cholesteric liquid crystal layer having the liquid crystal alignment pattern in which the orientation of the optical axes derived from the liquid crystal compound changes while continuously rotating as shown in FIG. 6 is observed with a scanning electron microscope (SEM), a striped pattern in which an arrangement direction in which bright portions and dark portions are alternately arranged is tilted at a predetermined angle with respect to a main plane (X-Y surface) is observed. That is, in the cross section of the cholesteric liquid crystal layer included in the spectroscope according to the embodiment of the present invention observed by SEM, the bright portion and the dark portion derived from the cholesteric liquid crystalline phase are tilted with respect to the main plane. Among these, in a case where the in-plane retardation Re of the cholesteric liquid crystal layer is measured in the normal direction and a direction tilted with respect to the normal direction, it is preferable that a direction in which the in-plane retardation Re is minimized is tilted with respect to the normal direction in any of the slow axis plane and the fast axis plane. Specifically, the absolute value of the measurement angle formed between the direction in which the in-plane retardation Re is minimized and the normal line is preferably 5° or more. In other words, it is preferable that the liquid crystal compound of the cholesteric liquid crystal layer is tilted with respect to the main plane and the tilt direction substantially coincides with the bright portion and the dark portion of the cholesteric liquid crystal layer. "Normal direction" means a direction orthogonal to the main plane. In a case where the cholesteric liquid crystal layer has such a configuration, circularly polarized light can be diffracted with higher diffraction efficiency than in a liquid crystal layer in which the liquid crystal compound 40 is parallel to the main plane. In the configuration in which the liquid crystal compound of the cholesteric liquid crystal layer is tilted with respect to the main plane and the tilt direction substantially coincides with the bright portion and the dark portion, the bright portion and the dark portion corresponding to the reflection surface and the optical axis of the liquid crystal compound coincide with each other. Therefore, the action of the liquid crystal compound on the reflection (diffraction) of light increases, and the diffraction efficiency can be improved. As a result, the light amount of the reflected light with respect to the incident light can be further improved.

Another Example of Cholesteric Liquid Crystal Layer

Figure 9:
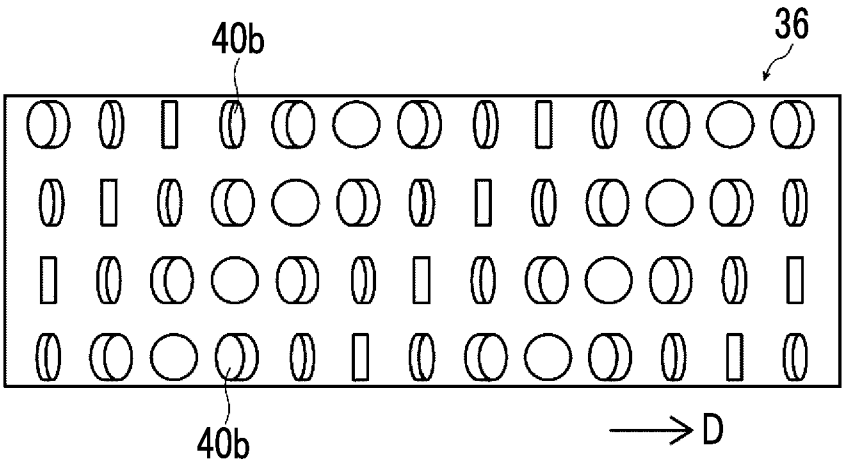
FIG. 9 is a diagram conceptually showing another example of the cholesteric liquid crystal layer included in the spectroscopic unit.

As shown in FIG. 9, the cholesteric liquid crystal layer 36 may be a layer formed using a disk-like liquid crystal compound 40*b*. As described above, the optical axis of the disk-like liquid crystal compound 40*b* is along the direction perpendicular to the disk plane. Accordingly, in the cholesteric liquid crystal layer 36 formed using the disk-like liquid crystal compound 40*b*, the disk-like liquid crystal compound 40*b* is aligned such that the disk plane is substantially perpendicular to the main plane of the cholesteric liquid crystal layer 36 and is aligned in the thickness direction such that the disk plane is helically twisted. In addition, in the plane direction of the cholesteric liquid crystal layer 36, the disk plane in the disk-like liquid crystal compound 40*b* changes while continuously rotating along the arrow direction of the arrangement axis D.

As described above, in the present invention, both the first cholesteric liquid crystal layer and the second cholesteric liquid crystal layer of the spectroscopic unit 10*a* may be a layer formed of a rod-like liquid crystal compound or a layer formed of a disk-like liquid crystal compound. Alternatively, one of the first cholesteric liquid crystal layer or the second cholesteric liquid crystal layer may be a layer formed of a rod-like liquid crystal compound, and the other may be a layer formed of a disk-like liquid crystal compound.

Figure 10:
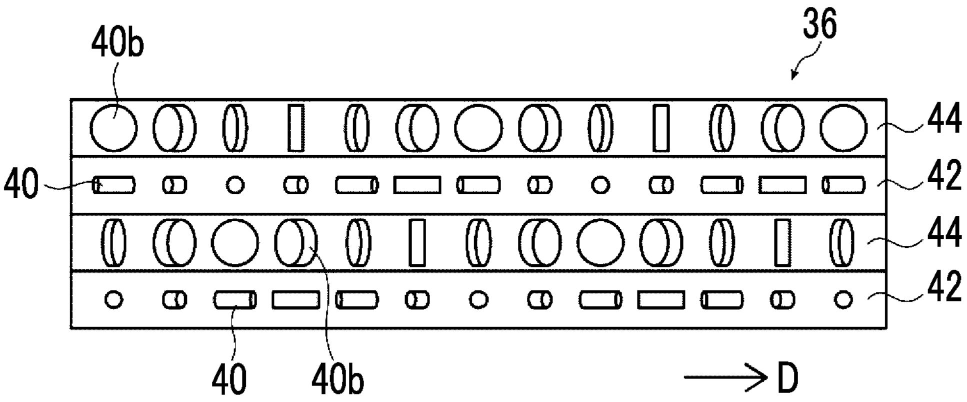
FIG. 10 is a diagram conceptually showing another example of the cholesteric liquid crystal layer included in the spectroscopic unit.

In addition, the cholesteric liquid crystal layer may have a configuration including a layer formed using a rod-like liquid crystal compound and a layer formed using a disk-like liquid crystal compound. FIG. 10 is a diagram schematically showing another example of the cholesteric liquid crystal layer included in the spectroscope of the embodiment of the present invention.

The cholesteric liquid crystal layer 36 shown in FIG. 10 alternately has a total of four layers of a rod-like liquid crystal layer 42 formed using a rod-like liquid crystal compound 40 and a disk-like liquid crystal layer 44 formed using a disk-like liquid crystal compound 40*b*. In FIG. 10, in order to simplify the drawing and to clarify the configuration of the cholesteric liquid crystal layer 36, only the liquid crystal compound on the surface of the rod-like liquid crystal layer 42 and the disk-like liquid crystal layer 44 are conceptually shown. However, the rod-like liquid crystal layer 42 and the disk-like liquid crystal layer 44 have a structure in which the liquid crystal compounds are laminated in the thickness direction.

The rod-like liquid crystal layer 42 is a layer in which the rod-like liquid crystal compound 40 is aligned in the liquid crystal alignment pattern in which the orientation of the optical axis changes while continuously rotating in at least one in-plane direction as in the example shown in FIG. 6. In addition, the disk-like liquid crystal layer 44 is a layer in which the disk-like liquid crystal compound 40*b* is aligned in the liquid crystal alignment pattern in which the orientation of the optical axis changes while continuously rotating in at least one in-plane direction as in the example shown in FIG. 9.

In one cholesteric liquid crystal layer 36, each of the rod-like liquid crystal layers 42 and each of the disk-like liquid crystal layers 44 have the same one period of the liquid crystal alignment pattern and the same rotation direction of the optical axis in the liquid crystal alignment pattern.

Here, in the example shown in FIG. 10, the longitudinal direction of the liquid crystal compound in the layer is twist-aligned in the thickness direction integrally from the rod-like liquid crystal layer 42 on the lower side in the drawing to the disk-like liquid crystal layer 44 on the upper side in the drawing. As a result, the two rod-like liquid crystal layers 42 and the two disk-like liquid crystal layers 44 serve as one cholesteric liquid crystal layer 36, and exhibit the same action as the cholesteric liquid crystal layers shown in FIG. 6 and the like. The longitudinal direction of the liquid crystal compound in the disk-like liquid crystal layer 44 is a longitudinal direction of a shape obtained by projecting the disk-like liquid crystal compound on a surface (interface) of the disk-like liquid crystal layer.

As described above, in a case where the cholesteric liquid crystal layer has a configuration in which the rod-like liquid crystal layer and the disk-like liquid crystal layer are laminated, the thickness-direction retardation Rth of the cholesteric liquid crystal layer can be reduced, and thus the light elliptically polarized by optical compensation can be returned to circularly polarized light to be selectively reflected with high efficiency.

In addition, it is preferable that the cholesteric liquid crystal layer has a pitch gradient structure in which a helical pitch P changes in a thickness direction. Specifically, the pitch gradient structure is a structure in which the helical pitch gradually increases (or decreases) from one main plane side toward the other main plane side of the cholesteric liquid crystal layer. The cholesteric liquid crystal layer can widen the range of the selective reflection wavelength by changing the helical pitch P in the thickness direction. Accordingly, in a case where the spectroscopic unit includes the cholesteric liquid crystal layer having the pitch gradient structure, the wavelength range to be spectrally separated can be widened. In other words, the cholesteric liquid crystal layer may be provided with the pitch gradient structure so as to reflect (diffract) light in the measurement wavelength range according to the desired measurement wavelength range of the spectroscope.

The cholesteric liquid crystal layer may have two or more regions in which the helical pitches P are different from each other in the thickness direction. The cholesteric liquid crystal layer may have a plurality of regions in which the selective reflection wavelengths are different in the thickness direction. The cholesteric liquid crystal layer has a plurality of regions having different helical pitches P in the thickness direction, and thus the selective reflection wavelength can be widened. Accordingly, in a case where the spectroscopic unit includes the cholesteric liquid crystal layer having a plurality of regions having different helical pitches P in the thickness direction, the wavelength range to be spectrally separated can be widened. In addition, a plurality of regions having a pitch gradient structure in which the selective reflection wavelength ranges may be different from each other in the thickness direction.

<Method for Forming Cholesteric Liquid Crystal Layer>

The cholesteric liquid crystal layer can be formed by fixing a cholesteric liquid crystalline phase in a layer shape. The structure in which a cholesteric liquid crystalline phase is fixed may be a structure in which the alignment of the liquid crystal compound as a cholesteric liquid crystalline phase is held. Typically, the structure in which a cholesteric liquid crystalline phase is fixed is preferably a structure in which a polymerizable liquid crystal compound is brought into an alignment state of a cholesteric liquid crystalline phase, polymerized and cured by ultraviolet irradiation or heating to form a layer having no fluidity, and at the same time, the state is changed to a state in which the alignment form is not changed by an external field or an external force. In the structure in which the cholesteric liquid crystalline phase is fixed, it is sufficient that the optical properties of the cholesteric liquid crystalline phase are maintained, and the liquid crystal compound in the cholesteric liquid crystal layer may not exhibit liquid crystallinity. For example, the molecular weight of the polymerizable liquid crystal compound may be increased by the curing reaction and the liquid crystallinity may be lost.

Examples of a material used for forming the cholesteric liquid crystal layer obtained by fixing a cholesteric liquid crystalline phase include a liquid crystal composition including a liquid crystal compound. It is preferable that the liquid crystal compound is a polymerizable liquid crystal compound. Furthermore, the liquid crystal composition used for forming the cholesteric liquid crystal layer may further include a surfactant and a chiral agent.

Polymerizable Liquid Crystal Compound

The polymerizable liquid crystal compound may be a rod-like liquid crystal compound or a disk-like liquid crystal compound. Examples of the rod-like polymerizable liquid crystal compound forming a cholesteric liquid crystalline phase include a rod-like nematic liquid crystal compound. As the rod-like nematic liquid crystal compound, azomethines, azoxys, cyanobiphenyls, cyanophenyl esters, benzoic acid esters, cyclohexane carboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles are preferable.

The polymerizable liquid crystal compound is obtained by introducing a polymerizable group into the liquid crystal compound. Examples of the polymerizable group include an unsaturated polymerizable group, an epoxy group, and an aziridinyl group, an unsaturated polymerizable group is preferable, and an ethylenically unsaturated polymerizable group is more preferable. The polymerizable group can be introduced into the molecule of the liquid crystal compound by various methods. The number of polymerizable groups included in the polymerizable liquid crystal compound is preferably 1 to 6, and more preferably 1 to 3. Examples of the polymerizable liquid crystal compound include compounds described in Makromol. Chem., Vol. 190, p. 2255 (1989), Advanced Materials, Vol. 5, p. 107 (1993), U.S. Pat. Nos. 4,683,327A, 5,622,648A, 5,770,107A, WO1995/022586A, WO1995/024455A, WO1997/000600A, WO1998/023580A, WO1998/052905A, JP1989-272551A (JP-H01-272551A), JP1994-016616A (JP-H6-016616A), JP1995-110469A (JP-H7-110469A), JP1999-080081A (JP-H11-080081A), JP2001-328973A. Two or more kinds of polymerizable liquid crystal compounds may be used in combination. In a case where two or more kinds of polymerizable liquid crystal compounds are used in combination, an alignment temperature can be decreased.

In addition, as the polymerizable liquid crystal compound other than those described above, a cyclic organopolysiloxane compound having a cholesteric phase as disclosed in JP1982-165480A (JP-S57-165480A), and the like can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the content of the polymerizable liquid crystal compound in the liquid crystal composition is preferably 75% to 99.9% by mass, more preferably 80% to 99% by mass, and still more preferably 85% to 90% by mass with respect to the solid content mass (mass excluding the solvent) of the liquid crystal composition.

——Surfactant——

The liquid crystal composition used for forming the cholesteric liquid crystal layer may include a surfactant. As the surfactant, a compound is preferable which can function as an alignment control agent making a contribution to the stable and rapid formation of a cholesteric liquid crystalline phase in a planar alignment. Examples of the surfactant include a silicone-based surfactant and a fluorine-based surfactant, and a fluorine-based surfactant is preferable.

Specific examples of the surfactant include compounds described in paragraphs "0082" to "0090" of JP2014-119605A, compounds described in paragraphs "0031" to "0034" of JP2012-203237A, compounds exemplified in paragraphs "0092" and "0093" of JP2005-099248A, the compounds exemplified in paragraphs "0076" to "0078" and paragraphs "0082" to "0085" of JP2002-129162A, and, the fluorine (meth)acrylate polymer described in paragraphs "0018" to "0043" of JP2007-272185A. As the surfactant, one kind may be used singly, or two or more kinds may be used in combination. As the fluorine-based surfactant, a compound described in paragraphs "0082" to "0090" of JP2014-119605A is preferable.

The content of the surfactant in the liquid crystal composition is preferably 0.01% to 10% by mass, more preferably 0.01% to 5% by mass, and still more preferably 0.02% to 1% by mass with respect to the total mass of the liquid crystal compound.

——Chiral Agent (Optically Active Agent)——

Chiral agent (chiral agent) functions to induce a helical structure of a cholesteric liquid crystalline phase. The chiral agent may be selected according to the purpose since the induced helical twisted direction or helical pitch varies depending on the compound. The chiral agent is not particularly limited, and known compounds (for example, those described in Liquid Crystal Device Handbook, Chapter 3, 4-3, Chiral Agents for Twisted Nematic (TN) and Super Twisted Nematic (STN), page 199, edited by No. 142 Committee of Japan Society for the Promotion of Science, 1989), isosorbides, isomannide derivatives, and the like can be used. The chiral agent generally contains an asymmetric carbon atom, but an axially asymmetric compound or a planarly asymmetric compound containing no asymmetric carbon atom can also be used as the chiral agent. Examples of the axially asymmetric compound or the planarly asymmetric compound include binaphthyl, helicene, paracyclophane, and derivatives thereof. The chiral agent may also have a polymerizable group. In a case where both the chiral agent and the liquid crystal compound have a polymerizable group, a polymer having a repeating unit derived from a polymerizable liquid crystal compound and a repeating unit derived from a chiral agent can be formed by a polymerization reaction between the polymerizable chiral agent and the polymerizable liquid crystal compound. In this aspect, the polymerizable group contained in the polymerizable chiral agent is preferably the same group as the polymerizable group contained in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group. Furthermore, the chiral agent may be a liquid crystal compound.

In a case where the chiral agent has a photoisomerization group, it is possible to form a pattern of a desired reflection wavelength corresponding to a luminescence wavelength by photomask irradiation such as actinic rays after coating and alignment, which is preferable. As the photoisomerization group, an isomerization site of a compound exhibiting photochromic properties, an azo group, an azoxy group, or a cinnamoyl group is preferable. As a specific compound, compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, JP2003-313292A, and the like can be used.

The content of the chiral agent in the liquid crystal composition is preferably from 0.01 to 200 mol %, more preferably from 1 to 30 mol %, based on the content molar amount of the liquid crystal compound.

——Polymerization Initiator——

In a case where the liquid crystal composition includes a polymerizable compound, it is preferable that the liquid crystal composition includes a polymerization initiator. In the aspect in which the polymerization reaction is caused to proceed by ultraviolet irradiation, as the polymerization initiator to be used, a photopolymerization initiator capable of initiating the polymerization reaction by ultraviolet irradiation is preferable. Examples of the photopolymerization initiator include an α-carbonyl compound (described in U.S. Pat. Nos. 2,367,661A and 2,367,670A), acyloin ether (described in U.S. Pat. No. 2,448,828A), an α-hydrocarbon-substituted aromatic acyloin compound (described in U.S. Pat. No. 2,722,512A), a polynuclear quinone compound (U.S. Pat. Nos. 3,046,127A and 2,951,758A), a combination of a triarylimidazole dimer and p-aminophenyl ketone (described in U.S. Pat. No. 3,549,367A), acridine and phenazine compounds (described in JP1983-105667A (JP-S60-105667A) and U.S. Pat. No. 4,239,850A), and an oxadiazole compound (described in U.S. Pat. No. 4,212,970A), and the like. The content of the photopolymerization initiator in the liquid crystal composition is preferably 0.1 to 20% by mass, and more preferably 0.5 to 12% by mass with respect to the content of the liquid crystal compound.

——Crosslinking Agent——

The liquid crystal composition may include a crosslinking agent, in order to improve film hardness after the curing and durability. As the crosslinking agent, an agent that cures with ultraviolet rays, heat, moisture, or the like can be suitably used. The crosslinking agent is not particularly limited and may be appropriately selected depending on the intended purpose. Examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having an oxazoline group in a side chain; and alkoxysilane compounds such as vinyltrimethoxysilane and N-(2-aminoethyl) 3-aminopropyltrimethoxysilane. Furthermore, according to the reactivity of the crosslinking agent, a known catalyst can be used, and the productivity can be improved in addition to the improvement of film hardness and durability. These may be used alone or in combination. The content of the crosslinking agent is preferably 3% to 20% by mass and more preferably 5% to 15% by mass with respect to the solid content mass of the liquid crystal composition.

——Other Additives——

Furthermore, as long as the optical performance and the like do not deteriorate, a polymerization inhibitor, an antioxidant, an ultraviolet absorber, a light stabilizer, a coloring material, metal oxide fine particles, and the like can be optionally added to the liquid crystal composition.

The liquid crystal composition is preferably used as a liquid when the cholesteric liquid crystal layer is formed. The liquid crystal composition may include a solvent. The solvent is not particularly limited and can be appropriately selected depending on the purpose, and an organic solvent is preferable. Examples of organic solvents include ketones, alkyl halides, amides, sulfoxides, heterocyclic compounds, hydrocarbons, esters, and ethers. These may be used alone or in combination.

When the cholesteric liquid crystal layer is formed, it is preferable that a liquid crystal composition is applied to a surface on which the cholesteric liquid crystal layer is formed, the liquid crystal compound is aligned in a state of a cholesteric liquid crystalline phase, and then the liquid crystal compound is cured to form the cholesteric liquid crystal layer. That is, in a case where the cholesteric liquid crystal layer is formed on the alignment film, it is preferable to coat the alignment film with the liquid crystal composition, align the liquid crystal compound in a state of cholesteric liquid crystalline phase, and then cure the liquid crystal compound so as to form the cholesteric liquid crystal layer obtained by fixing the cholesteric liquid crystalline phase. For the application of the liquid crystal composition, a printing method such as ink jet and scroll printing, and all known methods capable of uniformly applying a liquid to a sheet-like material, such as spin coating, bar coating, and spray coating, can be used.

The applied liquid crystal composition is dried and/or heated as necessary, and then cured to form a cholesteric liquid crystal layer. In the drying and/or heating step, the liquid crystal compound in the liquid crystal composition only has to be aligned to a cholesteric liquid crystalline phase. When heating is performed, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. It is preferable to use ultraviolet rays for the light irradiation. The irradiation energy is preferably 20 $mJ/cm^2$ to 50 $J/cm^2$, and more preferably 50 to 1,500 $mJ/cm^2$. In order to accelerate the photopolymerization reaction, the light irradiation may be performed under heating conditions or in a nitrogen atmosphere. The wavelength of the irradiated ultraviolet rays is preferably 250 to 430 nm.

The thickness of the cholesteric liquid crystal layer is not limited, and may be appropriately set according to the use of the spectroscope, the reflectivity of light required to the cholesteric liquid crystal layer, the material forming the cholesteric liquid crystal layer, and the like such that the necessary reflectivity of light is obtained.

The method for forming the spectroscopic unit is not particularly limited, and examples thereof include a method in which a cholesteric liquid crystal layer is formed by the above-described method, another cholesteric liquid crystal layer is further formed on the formed cholesteric liquid crystal layer by the above-described method, and the cholesteric liquid crystal layers are sequentially formed. Alternatively, after forming each of the first cholesteric liquid crystal layer and the second cholesteric liquid crystal layer, the spectroscopic unit may be formed by bonding together.

<Other Members>

The spectroscopic unit may include members other than the cholesteric liquid crystal layer.

(Support)

The spectroscopic unit may include a support. As the support, various sheet-shaped materials (films and plate-shaped materials) can be used as long as they can support a cholesteric liquid crystal layer, an alignment film described below, and the like. The transmittance of the support with respect to the corresponding light (for example, light having a wavelength of 550 nm) is preferably 50% or higher, more preferably 70% or higher, and still more preferably 85% or higher.

The thickness of the support is not particularly limited, and may be appropriately set according to the use of the spectroscope, the material for forming the support, and the like such that the alignment film and the cholesteric liquid crystal layer can be held. The thickness of the support is preferably 1 to 1,000 μm, more preferably 3 to 250 μm, and still more preferably 5 to 150 μm.

The support may be single-layered or multi-layered. Examples of the support in a case of being single-layered include supports formed of glass, triacetyl cellulose (TAC), polyethylene terephthalate (PET), polycarbonate, polyvinyl chloride, acryl, polyolefin, and the like. Examples of the support in a case of being multi-layered include supports including one of the above-described single-layered supports as a substrate and another layer that is provided on a surface of the substrate.

(Alignment Film)

The spectroscopic unit may include an alignment film. It is preferable that the cholesteric liquid crystal layer is formed on the alignment film. This alignment film is an alignment film for forming the above-described liquid crystal alignment pattern.

Various known alignment films can be used. Examples of the alignment film include a rubbing film formed of an organic compound such as a polymer, an obliquely deposited film consisting of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, and methyl stearate.

The alignment film by the rubbing treatment can be formed by rubbing the surface of the polymer layer several times in a certain direction with paper or cloth. As a material used for the alignment film, polyimide, polyvinyl alcohol, a polymer having a polymerizable group described in JP1997-152509A (JP-H9-152509A), and a material used for forming an alignment film described in JP2005-097377A, JP2005-099228A, and JP2005-128503A are preferable.

In the present invention, for example, the alignment film can be suitably used as a so-called photo-alignment film obtained by irradiating a photo-alignable material with polarized light or non-polarized light to form an alignment film. That is, in the present invention, a photo-alignment film that is formed by applying a photo-alignment material to the support is suitably used as the alignment film. The irradiation of the polarized light can be performed from a vertical direction or an oblique direction with respect to the photo-alignment film, and the irradiation of the non-polarized light can be performed from an oblique direction with respect to the photo-alignment film.

Preferred examples of the photo-alignment material used for the photo-alignment film usable in the present invention include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having a photo-alignment unit described in JP2002-265541A and JP2002-317013A, photo-crosslinkable silane derivatives described in JP4205195B and JP4205198B, photo-crosslinkable polyimides, photo-crosslinkable polyamides, and photo-crosslinkable polyesters described in JP2003-520878A, JP2004-529220A, and JP4162850B, and photo-dimerizable compounds described in JP1997-118717A (JP-H9-118717A), JP1998-506420A (JP-H10-506420A), JP2003-505561A, W02010/150748A, JP2013-177561A, and JP2014-12823A, particularly cinnamate compounds, chalcone compounds, and coumarin compounds. Among these, an azo compound, a photo-crosslinkable polyimide, a photo-crosslinkable polyamide, a photo-crosslinkable polyester, a cinnamate compound, or a chalcone compound is suitably used.

The thickness of the alignment film is not particularly limited and may be appropriately set according to the material for forming the alignment film such that a required alignment function can be obtained. The thickness of the alignment film is preferably 0.01 to 5 and more preferably 0.05 to 2 μm.

The method of forming the alignment film is not limited, and various known methods can be used according to the material for forming the alignment film. Examples thereof include a method of forming an alignment pattern by coating the surface of the support with an alignment film, drying the alignment film, and exposing the alignment film with laser light.

Figure 11:
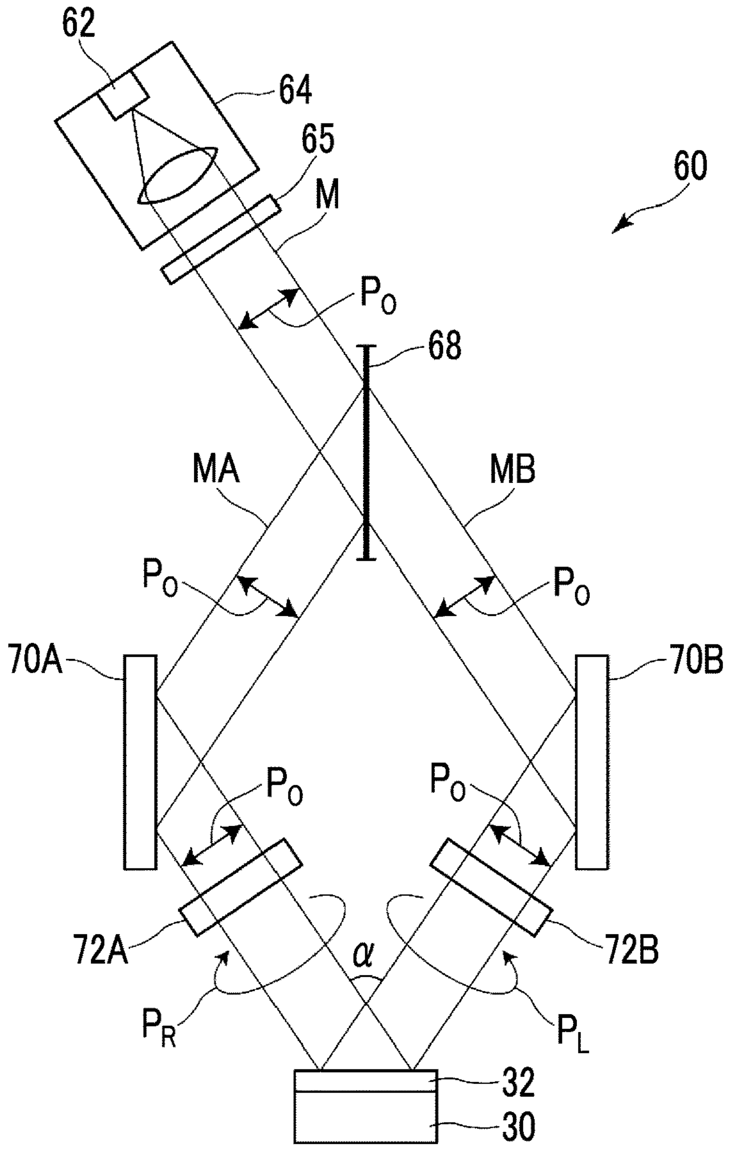
FIG. 11 is a conceptual diagram of an example of an exposure device for exposing an alignment film.

FIG. 11 conceptually shows an example of an exposure device that exposes the alignment film to form an alignment pattern. An exposure device 60 shown in FIG. 11 includes a light source 64 including a laser 62, an λ/2 plate 65 that changes a polarization direction of laser light M emitted from the laser 62, a beam splitter 68 that splits the laser light M emitted from the laser 62 into two beams MA and MB, mirrors 70A and 70B that are respectively disposed on optical paths of the splitted two beams MA and MB, and λ/4 plates 72A and 72B. Although not shown in the drawing, the light source 64 emits linearly polarized light $P_0$. The λ/4 plate 72A converts the linearly polarized light $P_0$ (beam MA) into dextrorotatory circularly polarized light $P_R$, and the λ/4 plate 72B converts the linearly polarized light $P_0$ (beam MB) into levorotatory circularly polarized light $P_L$.

The λ/4 plates 72A and 72B used here may be λ/4 plates corresponding to the wavelength of light to be irradiated. Since the exposure device 60 emits the laser light M, for example, when the center wavelength of the laser light M is 325 nm, a λ/4 plate that functions with respect to light having the wavelength of 325 nm may be used.

The support 30 including the alignment film 32 on which the alignment pattern is not yet formed is disposed in an exposed portion, the two beams MA and MB intersect and interfere with each other on the alignment film 32, and the alignment film 32 is irradiated with and exposed to the interference light. Due to the interference at this time, the polarization state of the light with which the alignment film 32 is irradiated periodically changes in the form of interference fringes. As a result, in the alignment film 32, an alignment pattern in which the alignment state periodically changes can be obtained. In the exposure device 60, the period of the alignment pattern can be adjusted by changing the intersecting angle α between the two beams MA and MB. That is, by adjusting the intersecting angle α in the exposure device 60, in the alignment pattern in which the optical axis derived from the liquid crystal compound 40 continuously rotates in one direction, the length of the one period over which the optical axis rotates by 180° in the one direction in which the optical axis rotates can be adjusted. By forming the cholesteric liquid crystal layer on the alignment film having the alignment pattern in which the alignment state periodically changes, the cholesteric liquid crystal layer having the liquid crystal alignment pattern in which the optical axis derived from the liquid crystal compound 40 continuously rotates in one direction can be formed. In addition, by rotating each of the optical axes of the λ/4 plates 72A and 72B by 90°, the rotation directions of the optical axes can be reversed.

[Spectroscope According to Second Aspect]

A spectroscope according to a second aspect of the present invention is a spectroscope that separates incident light to be measured including a spectroscopic unit that reflects and separates incident light and a detection unit that detects the light reflected from the spectroscopic unit, in which the spectroscopic unit includes a first cholesteric liquid crystal layer obtained by fixing a cholesteric liquid crystalline phase, a half-wavelength plate, and a second cholesteric liquid crystal layer obtained by fixing a cholesteric liquid crystalline phase in this order, the first cholesteric liquid crystal layer and the second cholesteric liquid crystal layer have a liquid crystal alignment pattern in which an orientation of an optical axis derived from a liquid crystal compound changes while continuously rotating in at least one in-plane direction, the rotation direction of the optical axis in the liquid crystal alignment pattern of the first cholesteric liquid crystal layer and the rotation direction of the optical axis in the liquid crystal alignment pattern of the second cholesteric liquid crystal layer are the same direction, the twisted direction of the liquid crystal compound in the thickness direction of the first cholesteric liquid crystal layer and the twisted direction of the liquid crystal compound in the thickness direction of the second cholesteric liquid crystal layer are the same direction.

Figure 12:
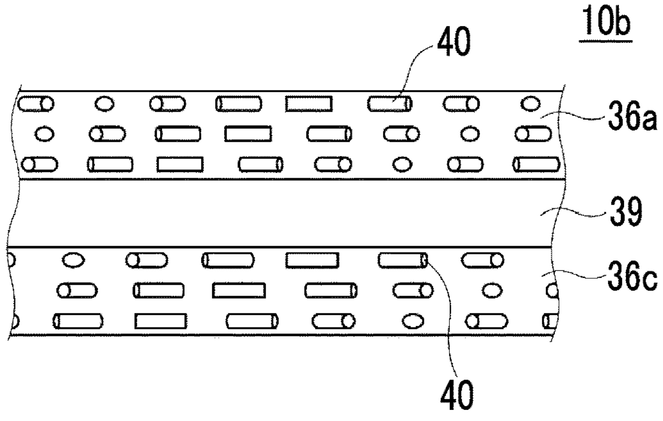
FIG. 12 is a side view conceptually showing another example of the spectroscopic unit included in the spectroscope.

FIG. 12 is a cross-sectional view schematically illustrating an example of a spectroscopic unit included in the spectroscope according to the embodiment of the present invention. The configuration of the spectroscope having the spectroscopic unit shown in FIG. 12 is the same as that of the spectroscope 100 shown in FIG. 1. That is, the spectroscope of the second aspect has the same configuration as the spectroscope 100 shown in FIG. 1, except that the configuration of the spectroscopic unit is different.

The spectroscopic unit 10*b* shown in FIG. 12 includes the first cholesteric liquid crystal layer 36*a*, the half-wavelength plate 39, and the second cholesteric liquid crystal layer 36*c*. The first cholesteric liquid crystal layer 36*a* and the second cholesteric liquid crystal layer 36*c* are layers formed by aligning and fixing a liquid crystal compound to a cholesteric liquid crystalline phase.

The first cholesteric liquid crystal layer 36*a* has the same configuration as that of the first cholesteric liquid crystal layer 36*a* shown in FIG. 2. That is, the first cholesteric liquid crystal layer 36*a* has a liquid crystal alignment pattern in which the orientations of the optical axes derived from the liquid crystal compound 40 change while rotating to the right (clockwise) from left to right when observed from above in FIG. 12. In addition, in the first cholesteric liquid crystal layer 36*a*, the twisted structure of the cholesteric liquid crystalline phase is twisted rightward (clockwise) from top to bottom in FIG. 12.

On the other hand, the second cholesteric liquid crystal layer 36*c* has the liquid crystal alignment pattern in which the orientation of the optical axes derived from the liquid crystal compound 40 changes while rotating to the right (clockwise) from the left to the right in a case of being observed from above in FIG. 12. In the second cholesteric liquid crystal layer 36*c*, the twisted structure in the thickness direction of the cholesteric liquid crystalline phase is twisted rightward (clockwise) from the top to the bottom in FIG. 12.

That is, in the first cholesteric liquid crystal layer 36*a* and the second cholesteric liquid crystal layer 36*c*, the rotation directions of the optical axes derived from the liquid crystal compound 40 in the liquid crystal alignment pattern are the same, and the twisted directions of the liquid crystal compound in the thickness direction are the same.

The rotation direction of the optical axes derived from the liquid crystal compound 40 in the liquid crystal alignment patterns of the first cholesteric liquid crystal layer 36*a* and the second cholesteric liquid crystal layer 36*c* and the twisted direction of the liquid crystal compound in the thickness direction are not limited to the above-described examples, and it is sufficient that the rotation directions of the optical axes derived from the liquid crystal compound 40 in the liquid crystal alignment patterns of the first cholesteric liquid crystal layer 36*a* and the second cholesteric liquid crystal layer 36*c* are the same and the twisted direction of the liquid crystal compound in the thickness direction is the same.

In addition, the spectroscopic unit 10 includes a half-wavelength plate 39 between the first cholesteric liquid crystal layer 36*a* and the second cholesteric liquid crystal layer 36*c*. As will be described in detail later, the half-wavelength plate 39 functions as a λ/2 plate having a λ/2 phase difference function at wavelengths in the reflection wavelength ranges of the first cholesteric liquid crystal layer 36*a* and the second cholesteric liquid crystal layer 36*c*. The half-wavelength plate 39 has a λ/2 phase difference function and thus converts circularly polarized light in a turning direction that is not reflected from the first cholesteric liquid crystal layer 36*a* and the second cholesteric liquid crystal layer 36*c* into circularly polarized light in a turning direction that is reflected from the first cholesteric liquid crystal layer 36*a* and the second cholesteric liquid crystal layer 36*c*.

<Description of Half-Wavelength Plate>

As shown in FIG. 12, the half-wavelength plate 39 is disposed between the first cholesteric liquid crystal layer 36*a* and the second cholesteric liquid crystal layer 36*c*. The half-wavelength plate 39 functions as a λ/2 plate having a substantially λ/2 phase difference function at wavelengths in the reflection wavelength ranges of the first cholesteric liquid crystal layer 36*a* and the second cholesteric liquid crystal layer 36*c*. The λ/2 plate refers to a plate in which an in-plane retardation Re (λ) at a specific wavelength λ nm satisfies Re (λ)=λ/2. The spectroscope according to the embodiment of the present invention may have a λ/2 phase difference function with respect to the wavelengths λ of the reflection wavelength ranges of the first cholesteric liquid crystal layer 36*a* and the second cholesteric liquid crystal layer 36*c*.

The half-wavelength plate 39 has a λ/2 phase difference function and thus converts circularly polarized light in a turning direction that is not reflected from the first cholesteric liquid crystal layer 36*a* and the second cholesteric liquid crystal layer 36*c* into circularly polarized light in a turning direction that is reflected from the first cholesteric liquid crystal layer 36*a* and the second cholesteric liquid crystal layer 36*c*.

The half-wavelength plate 39 is not particularly limited as long as it has a substantially λ/2 phase difference function at wavelengths in the reflection wavelength ranges of the first cholesteric liquid crystal layer 36*a* and the second cholesteric liquid crystal layer 36*c*, and various well-known retardation layers can be used. Examples of the λ/2 plate include a λ/2 plate obtained by polymerization of a polymerizable liquid crystal compound, a λ/2 plate formed of a polymer film, a λ/2 plate obtained by laminating two polymer films, a λ/2 plate having a retardation of λ/2 as a phase difference layer, and a λ/2 plate exhibiting a phase difference of λ/2 by structural birefringence.

In addition, the half-wavelength plate 39 may have a C-plate in addition to the λ/2 plate (so-called A-plate). The C-plate may be any of a positive C-plate or a negative C-plate. Since the half-wavelength plate 39 includes the C-plate, the half-wavelength plate 39 can be adjusted so as to exhibit a λ/2 phase difference function even with respect to light incident from an oblique direction with respect to the main plane of the half-wavelength plate 39.

The action of the spectroscopic unit 10*b* having such a configuration will be described. In the first cholesteric liquid crystal layer 36*a* of the example shown in FIG. 12, since the twisted direction in the thickness direction is twisted rightward and the rotation direction of the liquid crystal alignment pattern is the right direction, dextrorotatory circularly polarized light incident from the upper side in the drawing is reflected in the upper left direction.

The levorotatory circularly polarized light that is not reflected from the first cholesteric liquid crystal layer 36*a* passes through the first cholesteric liquid crystal layer 36*a* and is incident to the half-wavelength plate 39. Since the half-wavelength plate 39 has a λ/2 phase difference function, it converts levorotatory circularly polarized light into dextrorotatory circularly polarized light. The light converted into dextrorotatory circularly polarized light by the half-wavelength plate 39 is incident into the second cholesteric liquid crystal layer 36*c*. In the second cholesteric liquid crystal layer 36*c*, since the twisted direction in the thickness direction is the twisted rightward and the rotation direction of the liquid crystal alignment pattern is the right direction, the dextrorotatory circularly polarized light incident from the upper side in the drawing is reflected in the upper left direction. That is, the first cholesteric liquid crystal layer 36*a* and the second cholesteric liquid crystal layer 36*c* diffract circularly polarized light to be reflected in the same orientation. Accordingly, since the spectroscopic unit 10*b* can reflect light in the same direction regardless of the polarization state of incident light, the amount of light of each of the separated wavelength ranges can be increased.

In addition, as described above, in the diffraction element used in the spectroscope of the related art, the diffraction efficiency decreases as the diffraction angle increases, whereas in the diffraction by the cholesteric liquid crystal layer, the diffraction efficiency is unlikely to decrease even when the diffraction angle increases. In addition, in a diffraction element used in a spectroscope of the related art, a relationship between a wavelength and a diffraction efficiency is continuous. Therefore, light outside the measurement range may also be diffracted, and may be detected as noise in the detection unit 106. On the other hand, in the diffraction by the cholesteric liquid crystal layer, light in a specific wavelength range is diffracted with high diffraction efficiency, and light in other wavelength ranges is hardly diffracted. Therefore, it is possible to suppress light outside the measurement range from being detected in the detection unit, and to suppress noise.

As described above, since the spectroscopic unit 10*b* can bend the angle of light at a large diffraction angle, different diffraction angles of light depending on wavelengths can be obtained at a high resolution angle, and light can be diffracted with high diffraction efficiency. Therefore, since the amount of separated light incident on the detection unit is increased and the detection accuracy is also increased, the spectroscope according to the embodiment of the present invention can measure a spectrum with high accuracy even in a short detection time and can increase the measurement efficiency.

EXAMPLES

Characteristics of the present invention will be described in more detail with reference to the following examples and comparative examples. Materials, amounts used, ratios, treatment contents, treatment procedures, and the like provided in the following examples can be appropriately changed without departing from the gist of the present invention. Therefore, the scope of the invention will not be limitedly interpreted by the following specific examples.

Example 1

(Formation of Alignment Film)

A glass substrate was prepared as a support. The following coating liquid for forming an alignment film was applied to a support by spin coating. The support on which the coating film of the coating liquid for forming an alignment film had been formed was dried on a hot plate at 60° C. for 60 seconds, thereby forming an alignment film P-2.

Coating liquid for forming an alignment film

Material for Photo Alignment 1.00 Parts by Mass

Water 16.00 parts by mass

Butoxyethanol 42.00 parts by mass

Propylene glycol monomethyl ether 42.00 parts by mass

Material for Photo Alignment

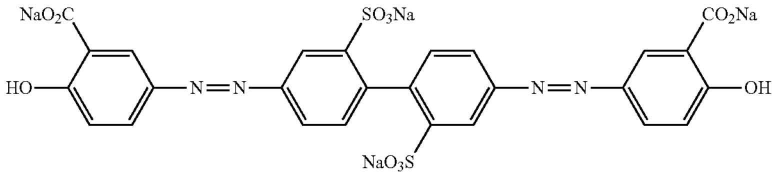

(Exposure of Alignment Film)

The obtained alignment film P-2 was irradiated with polarized ultraviolet rays (50 mJ/$cm^2$, using an ultra-high pressure mercury lamp) to expose the alignment film P-2. The alignment film was exposed using the exposure device shown in FIG. 11, thereby forming an alignment film P-2 having an alignment pattern. In the exposure device, a laser that emits laser light having a wavelength of (325 nm) was used as the laser. The exposure amount by the interference light was set to 300 mJ/$cm^2$. The intersecting angle (intersecting angle $\alpha$) of two light was adjusted such that the one period $\Lambda$ (the length over which the optical axis rotated by 180°) of an alignment pattern formed by the interference of two laser lights was 1 $\mu$m.

(Formation of First Cholesteric Liquid Crystal Layer)

As the liquid crystal composition forming the first cholesteric liquid crystal layer, the following liquid crystal composition LC-1 was prepared.

Liquid Crystal Composition LC-1

Liquid crystal compound L-1 100.00 parts by mass

Polymerization initiator (manufactured by Nippon Kayaku Co., Ltd., KAYACURE DETX-S) 1.00 part by mass Photo sensitizer (manufactured by Nippon Kayaku Co., Ltd., KAYACURE DETX-S) 1.00 parts by mass Leveling agent T-1 0.05 parts by mass Chiral agent Ch-3 4.00 parts by mass Methylethyl ketone 330.60 parts by mass Rod-Like Liquid Crystal Compound L-1 (Including the Following Structure at a Mass Ratio Shown on the Right)

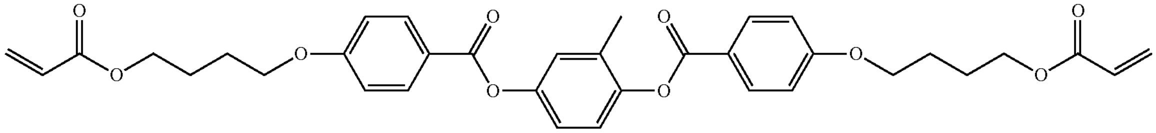

84%

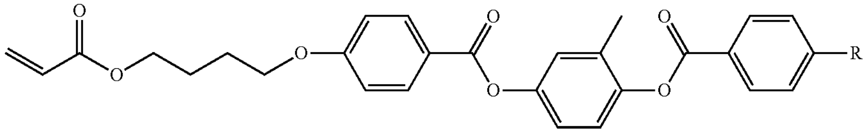

14%

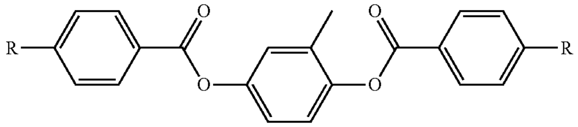

2%

R: 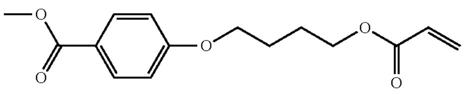

Leveling agent T-1

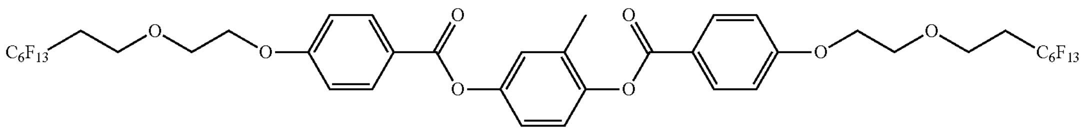

-continued

Chiral agent Ch-3

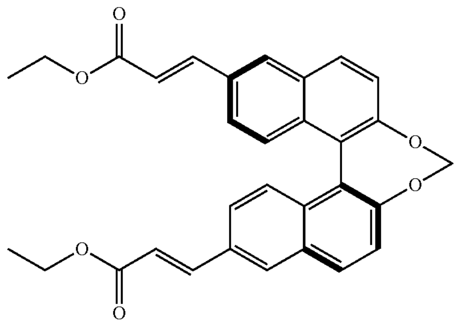

The alignment film P-2 was coated with the above-described liquid crystal composition LC-1 using a spin coater at a 750 rpm for 10 seconds. Next, as a first exposure step, the liquid crystal composition was exposed through a 300 nm long pass filter and a 350 nm short pass filter at 80° C. using a high-pressure mercury-vapor lamp. The first exposure step was performed such that the irradiation amount of light measured at wavelengths 315 nm was 10 $mJ/cm^2$. Next, the coating film of the liquid crystal composition LC-1 was heated on a hot plate at 80° C. for 3 minutes (180 sec), and then the coating film was irradiated with ultraviolet rays having wavelength of 365 nm at an irradiation amount of 300 $mJ/cm^2$ using a high-pressure mercury-vapor lamp in a nitrogen atmosphere at 80° C. to perform a second exposure step. As a result, the liquid crystal composition LC-1 was cured to fix the alignment of the liquid crystal compound, thereby forming a cholesteric liquid crystal layer. As a result, a first cholesteric liquid crystal layer was formed. The first cholesteric liquid crystal layer has a right-twisted helical structure in the thickness direction. The selective reflection center wavelength of the first cholesteric liquid crystal layer was 550 nm.

(Formation of Second Cholesteric Liquid Crystal Layer)

A second cholesteric liquid crystal layer was formed using the same method as that of the first cholesteric liquid crystal layer, except that the chiral agent in the liquid crystal composition LC-1 was changed to Ch-4. The second cholesteric liquid crystal layer has a left-twisted helical structure in the thickness direction. The selective reflection center wavelength of the second cholesteric liquid crystal layer was 550 nm.

Chiral agent Ch-4

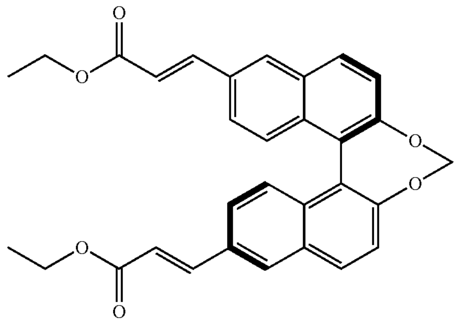

The first cholesteric liquid crystal layer and the second cholesteric liquid crystal layer were transferred and laminated to produce a diffraction element (spectroscopic unit). At this time, the first cholesteric liquid crystal layer and the second cholesteric liquid crystal layer were bonded such that the rotation directions of the optical axes in the liquid crystal alignment patterns of the first cholesteric liquid crystal layer and the second cholesteric liquid crystal layer were opposite to each other and the arrangement axis of the liquid crystal alignment pattern of the first cholesteric liquid crystal layer and the second cholesteric liquid crystal layer was 180°. In this manner, two cholesteric liquid crystal layers having opposite rotation directions of the optical axes in the liquid crystal alignment pattern and opposite twisted directions in the thickness direction are bonded to each other.

[Evaluation]

Unpolarized light in a wavelength range from 400 nm to 700 nm was incident on the produced optical element (spectroscopic unit), and the diffraction efficiencies at the respective wavelengths were measured using an optical power meter (manufactured by Thorlabs, Inc., product number PM16-130). The results are as follows.

Diffraction efficiency at 400 nm: 90%

Diffraction efficiency at 500 nm: 91%

Diffraction efficiency at 600 nm: 91%

Diffraction efficiency at 700 nm: 90%

That is, it was found that a high diffraction efficiency was obtained in a range of 400 nm to 700 nm. In addition, a CMOS sensor (manufactured by Hamamatsu Photonics K.K., product number S8377) was used to check spectroscopic performances in a wavelength range from 400 nm to 700 nm. As a result, it was confirmed that a high spectroscopic efficiency of 90% or more was obtained in this wavelength range, and the film functioned as a spectroscopic unit.

Example 2

Two cholesteric liquid crystal layers identical to the first cholesteric liquid crystal layer of Example 1 were prepared.

(Production of Half-Wavelength Plate)

A half-wavelength plate was produced by the following method.

The alignment film P-2 was formed on the support (glass substrate) in the same manner as the alignment film P-2 of the cholesteric liquid crystal layer of Example 1. The alignment film was exposed by irradiating the alignment film on the support with uniform polarized ultraviolet light (50 $mJ/cm^2$, using an ultra-high pressure mercury lamp). In addition, the following composition R-1 was prepared as a liquid crystal composition.

Composition R-1

Liquid crystal compound L-2 42.00 parts by mass
Liquid crystal compound L-3 42.00 parts by mass
Liquid crystal compound L-4 16.00 parts by mass
Polymerization initiator PI-1 0.50 parts by mass
Leveling agent G-1 0.20 parts by mass
Methylethyl ketone 176.00 parts by mass
Cyclopentanone 44.00 parts by mass Liquid crystal compound L-2

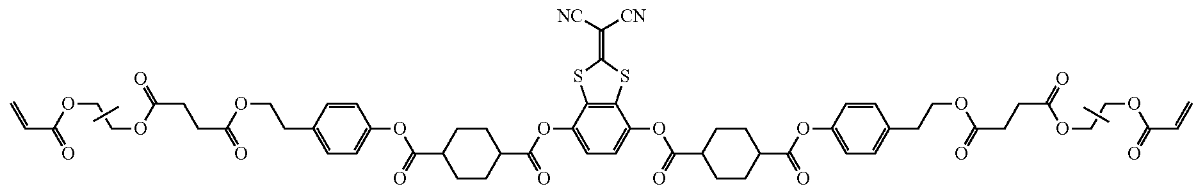

Me position isomer mixture

Liquid crystal compound L-3

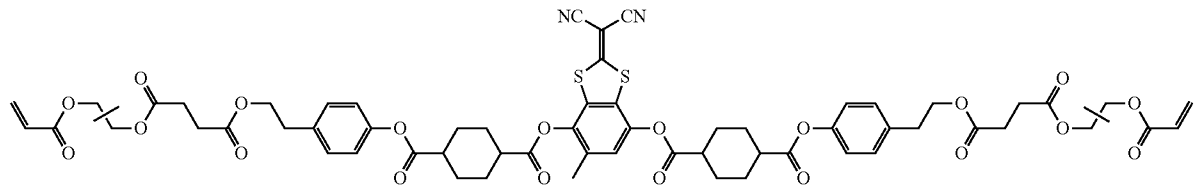

Me position isomer mixture

Liquid crystal compound L-4

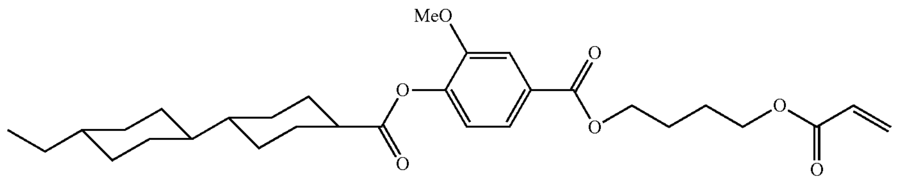

Polymerization initiator PI-1

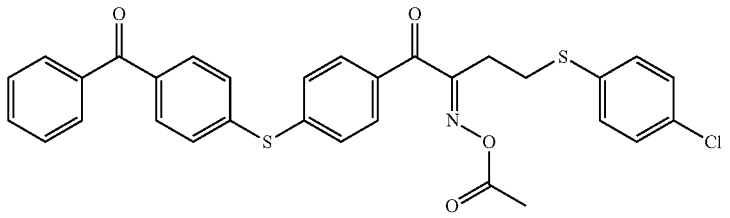

Leveling agent G-1

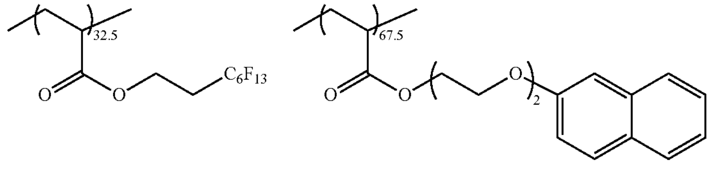

The prepared composition R-1 was applied onto the alignment film. The coating film was heated on a hot plate to 70° C. and then cooled to 65° C. Thereafter, the coating film was irradiated with ultraviolet rays having wavelength of 365 nm at an irradiation amount of 500 mJ/$cm^2$ using a high-pressure mercury-vapor lamp in a nitrogen atmosphere to fix the alignment of the liquid crystal compound, thereby producing a half-wavelength plate. The retardation of the half-wavelength plate thus produced is 275 nm, and the wavelength dispersion shows a reverse dispersion characteristic.

The produced half-wavelength plate was disposed and laminated between two cholesteric liquid crystal layers to produce a diffraction element (spectroscopic unit). At this time, the rotation directions of the optical axes in the liquid crystal alignment patterns of the two cholesteric liquid crystal layers were set to be the same. By laminating in this manner, dextrorotatory circularly polarized light is reflected and diffracted by the cholesteric liquid crystal layer on one side, levorotatory circularly polarized light passes through the half-wavelength plate and becomes dextrorotatory circularly polarized light, and is reflected and diffracted by the cholesteric liquid crystal layer on the other side, and as a result, dextrorotatory and levorotatory circularly polarized light are also reflected and diffracted in the same direction.

[Evaluation]

Unpolarized light in a wavelength range from 400 nm to 700 nm was incident on the produced optical element (spectroscopic unit), and the diffraction efficiencies at the respective wavelengths were measured using an optical power meter (manufactured by Thorlabs, Inc., product number PM16-130). The results are as follows.

Diffraction efficiency at 400 nm: 90%

Diffraction efficiency at 500 nm: 91%

Diffraction efficiency at 600 nm: 91%

Diffraction efficiency at 700 nm: 90%

That is, it was found that high diffraction efficiency was obtained in the range of 400 nm to 700 nm. In addition, a CMOS sensor (manufactured by Hamamatsu Photonics K.K., product number S8377) was used to check spectroscopic performances in a wavelength range from 400 nm to 700 nm. As a result, it was confirmed that a high spectroscopic efficiency of 90% or more was obtained in this wavelength range, and the film functioned as a spectroscopic unit.

In Examples 1 and 2, the incidence angle θin with respect to the spectroscopic unit was 0°, and the diffraction angle θout of the reflected diffracted light was a value represented by a diffraction expression of $\sin(\theta in)+\sin(\theta out)=\lambda/\Lambda$. The present invention is not limited to this embodiment, and θin and the periodic pitch Λ can be appropriately adjusted depending on the wavelength λ to be measured. Based on the above-described results, the effects of the present invention are apparent.

EXPLANATION OF REFERENCES

10, 10A, 10B: spectroscope
30: support
32: alignment film
36: cholesteric liquid crystal layer
36*a*: first cholesteric liquid crystal layer
36*b*, 36*c*: second cholesteric liquid crystal layer
38: C-plate
39: half-wavelength plate
40: (rod-like) liquid crystal compound
40*b*: disk-like liquid crystal compound
40A: optical axis
42: rod-like liquid crystal layer
44: disk-like liquid crystal layer
60: exposure device
62: laser
64: light source
65: λ/2 plate
68: beam splitter
70A, 70B: mirror
72A, 72B: λ/4 Plate
100: SPECTROSCOPE
102: housing
104: transmission unit
106: detection unit
D: arrangement axis
P: helical pitch
Λ: one period
M: laser light
MA: beam
MB: beam
$P_0$: linearly polarized light
$P_L$: levorotatory circularly polarized light
$P_r$: dextrorotatory circularly polarized light
α: intersecting angle
$R_R$: dextrorotatory circularly polarized light

What is claimed is:

1. A spectroscope that separates incident light to be measured, the spectroscope comprising:

a spectroscopic unit that reflects and separates incident light; and a detection unit that detects the light reflected from the spectroscopic unit, wherein the spectroscopic unit includes a first cholesteric liquid crystal layer obtained by fixing a cholesteric liquid crystalline phase and a second cholesteric liquid crystal layer obtained by fixing a cholesteric liquid crystalline phase, the first cholesteric liquid crystal layer and the second cholesteric liquid crystal layer have a liquid crystal alignment pattern in which an orientation of an optical axis derived from a liquid crystal compound changes while continuously rotating in at least one in-plane direction, a rotation direction of the optical axis in the liquid crystal alignment pattern of the first cholesteric liquid crystal layer is opposite to a rotation direction of the optical axis in the liquid crystal alignment pattern of the second cholesteric liquid crystal layer, and a twisted direction of the liquid crystal compound in a thickness direction of the first cholesteric liquid crystal layer is opposite to a twisted direction of the liquid crystal compound in a thickness direction of the second cholesteric liquid crystal layer.

2. A spectroscope that separates incident light to be measured, the spectroscope comprising:

a spectroscopic unit that reflects and separates incident light; and a detection unit that detects the light reflected from the spectroscopic unit, wherein the spectroscopic unit includes a first cholesteric liquid crystal layer obtained by fixing a cholesteric liquid crystalline phase, a half-wavelength plate, and a second cholesteric liquid crystal layer obtained by fixing a cholesteric liquid crystalline phase in this order, the first cholesteric liquid crystal layer and the second cholesteric liquid crystal layer have a liquid crystal alignment pattern in which an orientation of an optical axis derived from a liquid crystal compound changes while continuously rotating in at least one in-plane direction, a rotation direction of the optical axis in the liquid crystal alignment pattern of the first cholesteric liquid crystal layer and a rotation direction of the optical axis in the liquid crystal alignment pattern of the second cholesteric liquid crystal layer are the same, and a twisted direction of the liquid crystal compound in a thickness direction of the first cholesteric liquid crystal layer and a twisted direction of the liquid crystal compound in a thickness direction of the second cholesteric liquid crystal layer are the same.

3. The spectroscope according to claim 1, wherein the spectroscopic unit further includes a C-plate.

4. The spectroscope according to claim 1, wherein one of the first cholesteric liquid crystal layer or the second cholesteric liquid crystal layer is a layer formed of a rod-like liquid crystal compound, and the other of the first cholesteric liquid crystal layer or the second cholesteric liquid crystal layer is a layer formed of a disk-like liquid crystal compound.

5. The spectroscope according to claim 1, wherein at least one of the first cholesteric liquid crystal layer or the second cholesteric liquid crystal layer includes a layer formed of a rod-like liquid crystal compound and a layer formed of a disk-like liquid crystal compound.

6. The spectroscope according to claim 1, further comprising:

a transmission unit that is disposed on an incidence side of the spectroscopic unit and that allows the light to be measured to be incident on the spectroscopic unit.

7. The spectroscope according to claim 2, wherein the spectroscopic unit further includes a C-plate.

8. The spectroscope according to claim 2, wherein one of the first cholesteric liquid crystal layer or the second cholesteric liquid crystal layer is a layer formed of a rod-like liquid crystal compound, and the other of the first cholesteric liquid crystal layer or the second cholesteric liquid crystal layer is a layer formed of a disk-like liquid crystal compound.

9. The spectroscope according to claim 2, wherein at least one of the first cholesteric liquid crystal layer or the second cholesteric liquid crystal layer includes a layer formed of a rod-like liquid crystal compound and a layer formed of a disk-like liquid crystal compound.

10. The spectroscope according to claim 2, further comprising:

a transmission unit that is disposed on an incidence side of the spectroscopic unit and that allows the light to be measured to be incident on the spectroscopic unit.

11. The spectroscope according to claim 3, wherein one of the first cholesteric liquid crystal layer or the second cholesteric liquid crystal layer is a layer formed of a rod-like liquid crystal compound, and the other of the first cholesteric liquid crystal layer or the second cholesteric liquid crystal layer is a layer formed of a disk-like liquid crystal compound.

12. The spectroscope according to claim 3, wherein at least one of the first cholesteric liquid crystal layer or the second cholesteric liquid crystal layer includes a layer formed of a rod-like liquid crystal compound and a layer formed of a disk-like liquid crystal compound.

13. The spectroscope according to claim 3, further comprising:

a transmission unit that is disposed on an incidence side of the spectroscopic unit and that allows the light to be measured to be incident on the spectroscopic unit.

14. The spectroscope according to claim 7, wherein at least one of the first cholesteric liquid crystal layer or the second cholesteric liquid crystal layer includes a layer formed of a rod-like liquid crystal compound and a layer formed of a disk-like liquid crystal compound.

15. The spectroscope according to claim 7, further comprising:

a transmission unit that is disposed on an incidence side of the spectroscopic unit and that allows the light to be measured to be incident on the spectroscopic unit.

* * * * *